(12) United States Patent
Choi et al.

(10) Patent No.: US 11,027,241 B2
(45) Date of Patent: Jun. 8, 2021

(54) METHOD OF POST-TREATING ZEOLITE MEMBRANES BY USING DYE MOLECULES

(71) Applicant: Korea University Research and Business Foundation, Seoul (KR)

(72) Inventors: Jungkyu Choi, Seoul (KR); Kwan Young Lee, Seoul (KR); Sung-Won Hong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 238 days.

(21) Appl. No.: 16/388,917

(22) Filed: Apr. 19, 2019

(65) Prior Publication Data

US 2019/0321785 A1    Oct. 24, 2019

(30) Foreign Application Priority Data

Apr. 20, 2018    (KR) .......................... 10-2018-0046058

(51) Int. Cl.
*B01D 65/10*    (2006.01)
*B01D 71/02*    (2006.01)
*B01D 53/22*    (2006.01)

(52) U.S. Cl.
CPC ......... *B01D 65/108* (2013.01); *B01D 53/228* (2013.01); *B01D 71/028* (2013.01)

(58) Field of Classification Search
None
See application file for complete search history.

(56) References Cited

U.S. PATENT DOCUMENTS 4,544,538 A    10/1985    Zones

FOREIGN PATENT DOCUMENTS

| JP | 10-506319 A | 6/1998 |
| JP | 2002-263457 A | 9/2002 |
| WO | WO 2010/106881 A1 | 9/2010 |
| WO | WO 2011/044366 A | 4/2011 |
| WO | WO 2011/044366 A1 * | 4/2011 | ............. A01N 43/04 |

OTHER PUBLICATIONS

Hong, Sungwon et al., "Modeling of Structural Defects in MFI Zeolite Membranes", AIChE Annual Meeting Conference Poster, 2 pages, 2017. (Year: 2017).*

(Continued)

*Primary Examiner* — Jason M Greene
(74) *Attorney, Agent, or Firm* — NSIP Law

(57) ABSTRACT

The present invention relates to a method of post-treating a zeolite membrane, comprising treating a defective zeolite membrane with a chemical material such as a dye molecule, which has a size larger than that of the pores of the zeolite membranes and smaller than defects in the membrane, thereby healing the defects in the membrane. The post-treatment method performs post-treatment of the zeolite membrane under mild conditions (room temperature and normal pressure), thereby selectively healing the defects in the zeolite membrane and improving the performance of the zeolite membrane. In addition, the method may provide a high-performance membrane having a high separation factor, particularly under dry conditions.

8 Claims, 12 Drawing Sheets
(11 of 12 Drawing Sheet(s) Filed in Color)

Dye-treated
SSZ-13 membrane

Intact
SSZ-13 membrane

(56) References Cited

OTHER PUBLICATIONS

Bonilla, Griselda et al., "Fluorescence confocal optical microscopy imaging of the grain boundary structure of zeolite MFI membranes made by secondary (seeded) growth", Journal of Membrane Science, 182, 2001, pp. 103-109. (Year: 2001).*

Nomura, Mikihiro et al., "Silicalite Membranes Modified by Counterdiffusion CVD Technique," *Industrial & engineering chemistry research*, vol. 36, Issue 10, 1997 (pp. 4217-4223).

Szejtil, Jo'zsef, "Introduction and General Overview of Cyclodextrin Chemistry", *Chemistry Reviews*, 1998 (pp. 1743-1753).

Xomeritakis, George et al., "Separation of Xylene Isomer Vapors with Oriented MFI Membranes Made by Seeded Growth", *Industrial & engineering chemistry research*, 40, 2, 2001 (pp. 544-552).

Bonilla, Griselda et al., "Fluorescence confocal optical microscopy imaging of the grain boundary structure of zeolite MFI membranes made by secondary (seeded) growth", *Journal of Membranes Science*, vol. 182, Issue 1-2, Feb. 15, 2001 (103-109).

Boddenberg, B. et al., "A calorimetric and statistical mechanics study of water adsorption in zeolite NaY", *Physical Chemistry Chemical Physics*, Issue 17, 2002 (pp. 1-9).

Kalipcilar, Halil et al., "Synthesis and Separation Performance of SSZ-13 Zeolite Membranes on Tubular Supports", *Chemistry of Materials*, vol. 14, Issue 8, 2002 (pp. 3458-3464).

Li, Shiguang et al., "High-Pressure $CO_2/CH_4$ Separating Using SAPO-34 Membranes", *Industrial & Engineering Chemistry Research*, 44, 2005 (pp. 3220-3228).

Caro, Jürgen et al., "Zeolite Membranes: From the Laboratory Scale to Technical Applications", *Adsorption*, vol. 11, Issue 3-4, Jul. 2005, (pp. 215-227).

Gu, Xuehong et al., "Synthesis of Defect-Free FAU-Type Zeolite Membranes and Separation for Dry and Moist $CO_2/N_2$ Mixtures", *Industrial & Engineering Chemistry Research*, 44,4, 2005, (pp. 937-944).

Choi, Jungkyu et al., "MFI zeolite membranes from a- and randomly oriented monolayers", *Adsorption*, vol. 12, Issue 5-6, Sep. 2006, (pp. 339-360).

Zheng, Zhenkun et al., "Synthesis, characterization and modification of DDR membranes grown on a-alumina supports", *Journal of Materials Science*, vol. 43, Issue 7, Apr. 2008, (pp. 2499-2502).

Zhang, Baoquan et al., "Selective Defect-Patching of Zeolite Membranes Using Chemical Liquid Deposition at Organic/Acqueous Interfaces", *Advanced Functional Materials*, vol. 18, Issue 21, Nov. 10, 2008 (pp. 3434-3443).

Krishna, R. et al., "Segregation effects in adsorption of $CO_2$-containing mixtures and their consequences for separation selectivities in cage-type zeolites", *Separation and Purification Technology*, vol. 61, Issue 3, Jul. 15, 2008, (pp. 414-423).

Wee, Shin-Ling et al., "Membrane separation process—Pervaporation through zeolite membrane", *Separation and Purification Technology*, vol. 63, Issue 3, Nov. 3, 2008, (pp. 500-506).

Gu, Xuehong et al., "On-stream modification of MFI zeolite membranes for enhancing hydrogen separation at high temperature", *Microporous and Mesoporous Materials*, vol. 111, Issues 1-3, Apr. 15, 2008, (pp. 441-448).

Himeno, Shuji et al., "Synthesis and Permeation Properties of a DDR-Type Zeolite Membrane for Separation of $CO_2/CH_4$ Gaseous Mixtures", *Industrial & Engineering Chemistry Research*, 46, 2007 (pp. 6989-6997).

Choi, Jungkyu et al., "Grain Boundary Defect Elimination in a Zeolite Membrane by Rapid Thermal Processing", *Science*, vol. 325, Issue 5940, Jul. 31, 2009 (pp. 590-593).

Favre, Eric, et al., "Biogas, membranes and carbon dioxide capture", *Journal of Membrane Science*, vol. 328, Issues 1-2, Feb. 20, 2009, (pp. 11-14).

Zhang, Yanfeng et al., "Template removal from SAPO-34 crystals and membranes", *Journal of Membrane Science*, vol. 363, Issues 1-2, Nov. 1, 2010, (pp. 29-35).

Zhang, Yanfeng et al., "Blocking defects in SAPO-34 membranes with cyclodetrin", *Journal of Membrane Science*, vol. 358, Issues 1-2, Aug. 15, 2010, (pp. 7-12).

Merkel, Tim C. et al., Power plant post-combustion carbon dioxide capture: An opportunity for membranes, *Journal of Membrane Science*, vol. 359, Issues 1-2, Sep. 1, 2010, (pp. 126-139).

Shan, Ligun et al., "Preparation of zeolite MFI membranes on alumina hollow fibers with high flux for pervaporation", *Journal of Membrane Science*, vol. 378, Issues 1-2, Aug. 15, 2011, (pp. 319-329).

Hong, Zhou et al., "A simple method for healing nonzeolitic pores of MFI membrances by hydrolysis of silances", *Journal of Membrane Science*, vol. 366, Issues 1-2, Jan. 1, 2011, (pp. 427-435).

Hirota, Yuichiro et al., "Coke deposition in the SAPO-34 membranes for examining the effects of zeolitic and non-zeolitic pathways on the permeations", *Journal of Membrane Science*, vol. 415-416, Oct. 1, 2012, (pp. 176-180).

Hong, Zhou et al., "Catalytic Cracking Deposition of Methyldiethoxysilane for Modification of Zeolitic Pores in MFI/α-Al2O3 Zeolite Membrane with H+ Ion Exchange Pretreatment", *Industrial & Engineering Chemistry Research*, 52, 2013 (pp. 13113-13119).

Kosinov, Nikolay et al., "High flux high-silica SSZ-13 membrane for CO2 separation", *Journals of Materials Chemistry A*, Jun. 19, 2014 (pp. 13083-13092).

Kim, Eunjoo et al., "Chemical Vapor Deposition on Chabazite (CHA) Zeolite Membranes for Effective Post-Combustion CO2 Capture", *Environmental Science & Technology*, 2014 (pp. 14828-14836).

Zheng, Yihong et al., "Preparation of steam-stable high-silica CHA(SSZ-13) membranes for CO2/CH4 and C2H4/C2H6 separation", *Journal of Membrane Science*, vol. 475, Feb. 1, 2015, (pp. 303-310).

Kosinov, Nikolay et al., "Influence of the Si/Al ratio on the separation properties of SSZ-13 zeolite membranes", *Journal of Membrane Science*, vol. 484, Jun. 15, 2015, (pp. 140-145).

Wu, Ting et al., "Influence of propane on CO2/CH4 and N2/CH4 separations in CHA zeolite membranes", *Journal of Membrane Science*, vol. 473, Jan. 1, 2015, (pp. 201-209).

Karimi, Somayeh et al., "A simple method for blocking defects in zeolite membranes", Journal of Membrane Science, vol. 489, Sep. 1, 2015, (pp. 270-274).

Agrawal, Kumar Varoon et al., "Oriented MFI Membranes by Gel-Less Secondary Growth of Sub-100 nm MFI-Nanosheet Seed Layers", *Advanced Materials*, 2015, (pp. 3243-3249).

Maghsoudi, Hafez, "Defects of Zeolite Membranes: Characterization, Modification and Post-treatment Techniques", *Separation & Purification Reviews*, Sep. 13, 2017 (pp. 169-192).

Huang, Yi, et al., "Growth of High-Quality, Thickness-Reduced Zeolite Membranes towards n2/CH4 Separation Using High-Aspect-Ratio Seeds", *Angewandte Chemie International Edition*, vol. 54, Issue 37, Sep. 7, 2015 (pp. 10843-10847).

Zhou, Chen et al., "Efficient Synthesis of Dimethyl Ether from Methanol in a Bifunctional Zeolite Membrane Reactor", *Angewandte Chemie International Edition*, vol. 55, Issue 41, Oct. 4, 2016 (pp. 12678-12682).

Kim, Eunjoo et al., "An oriented, siliceous deca-dodecasil 3R (DDR) zeolite film for effective carbon capture: insight into its hydrophobic effect", *Journal of Materials Chemistry A*, Issue 22, 2017 (pp. 11246-11254).

Kida, Koji et al., "Preparation and gas permeation properties on pure silica CHA-type zeolite membranes", *Journal of Membrane Science*, vol. 522, Jan. 15, 2017 ( pp. 363-370).

Korelskiy, D. et al., "Selective blocking of grain boundary defects in high-flux zeolite membranes by coking", *Journal of Materials Chemistry A*, Issue 16, 2017 (pp. 7295-7299).

Hong, Sungwon et al., "Modeling of Structural Defects in MFI Zeolite Memabranes", *AIChE Annual Meeting Conference Poster*, 2017 (2 Pages in English).

Korean Office Action dated Jun. 20, 2019 in counterpart Korean Patent Application No. 10-2018-0046058 (4 Pages in English, 5 Pages in Korean).

(56) References Cited

OTHER PUBLICATIONS

Korean Notice of Allowance dated Oct. 11, 2019 in counterpart Korean Patent Application No. 10-2018-0046058 (1 Page in English, 1 Page in Korean).

* cited by examiner (a1) M_1mM   (a2)

(b1) M_10mM   (b2)

(c1) M_50mM   (c2)

METHOD OF POST-TREATING ZEOLITE MEMBRANES BY USING DYE MOLECULES

CROSS-REFERENCE TO RELATED APPLICATIONS

This application claims the benefit under 35 USC § 119(a) of Korean Patent Application No. 10-2018-0046058 filed on Apr. 20, 2018 in the Korean Intellectual Property Office, the entire disclosures of all of which are incorporated herein by reference for all purposes.

TECHNICAL FIELD

The present invention relates to a method of post-treating a zeolite membrane, and more particularly to a method of post-treating a zeolite membrane with dye molecules, which can improve the performance of the membrane in a simpler and easier manner than a conventional method.

BACKGROUND ART

Among carbon dioxide capture technologies, a membrane technology has a disadvantage over a commercialized amine absorption method in that the purity of captured carbon dioxide is low. To overcome this disadvantage, various studies focused on increasing the separation factors of membranes have been reported. The most commonly suggested methods are chemical liquid deposition (CLD) and chemical vapor deposition (CVD), which are methods of depositing chemical substances on zeolite surfaces to block defects. In addition, there is a method of coating a zeolite surface after synthesizing a zeolite membrane. However, the above-described methods have a shortcoming in that because zeolite pores and defects are non-selectively treated, the zeolite pores that actually act as molecular sieves are also blocked, resulting in a decrease in flux. These methods can effectively increase separation factors (SF), but follow a trade-off relationship that significantly reduces flux. Therefore, post-treatment methods of selectively reducing only defects to overcome this shortcoming have been suggested, but studies thereon have not yet been sufficient.

Zeolite membranes have been widely studied for the separation of gas mixtures (Huang, Y. et al., *Angew. Chem. Int. Edit.* 2015, 54, 10843-10847) and liquid mixtures (Wee, S. L. et al., *Sep. Purif. Technol.* 2008, 63, 500-516) due to their rigid molecular-sized pore structure and/or preferred adsorption/diffusion properties (Caro, J. et al., *Adsorption* 2005, 11, 215-227). The molecular sieving ability of the zeolite membrane can be further complemented with a reaction as means to overcome equilibrium-limited reactions (Zhou, C. et al., *Angew. Chem. Int. Edit.* 2016, 55, 12678-12682). Thus, most studies have focused on the fabrication of defect-free zeolite membranes, as it is believed to be essential for realizing intrinsic molecular sieving (Maghsoudi, H., *Sep. Purif. Rev.* 2016, 45, 169-192; Gu, X. H. et al., *Ind. Eng. Chem. Res.* 2005, 44, 937-944; Choi, J. et al., *Science* 2009, 325, 590-593). Defects in zeolite films are usually (1) grain boundaries that exist among the polycrystalline membrane constituents or grains and (2) cracks that interconnect grain boundaries and/or cross membrane grains (Bonilla, G. et al., *J. Membr. Sci.* 2001, 182, 103-109). Both types of defects are known to occur primarily during the removal of organic templates at high temperatures (>500° C.). Such defects, although few in number, hamper the intrinsic molecular sieving of zeolite membranes, as they often provide non-selective pathways for all permeating species (Korelskiy, D. et al., *J. Mater. Chem. A* 2017, 5, 7295-7299). Although attempts have been undertaken to develop alternative approaches for template removal (Choi, J. et al., *Science* 2009, 325, 590-593), many efforts have been made to repair such defects via using a suitable post-treatment such as chemical vapor deposition (CVD) (Gu, X. H. et al., *Microporous Mesoporous Mater.* 2008, 111, 441-448; Kim, E. et al., *Environ. Sci. Technol.* 2014, 48, 14828-14836; Zheng, Z. et al., *J. Mater. Sci.* 2008, 43, 2499-2502), chemical liquid deposition (CLD) (Zhang, B. Q. et al., *Adv. Funct. Mater.* 2008, 18, 3434-3443; Hong, Z. et al., *J. Membr. Sci.* 2011, 366, 427-435), silica coating (Xomeritakis, G. et al., *Ind. Eng. Chem. Res.* 2001, 40, 544-552; Karimi, S. et al., *J. Membr. Sci.* 2015, 489, 270-274), catalytic cracking deposition (CCD) (Hong, Z. et al., *Ind. Eng. Chem. Res.* 2013, 52, 13113-13119;), coke formation (Hirota, Y. et al., *J. Membr. Sci.* 2012, 415, 176-180), or the like.

In a zeolite membrane formation process and a calcination process, defects are inevitably formed. The defects provide non-selective pathways through which even unwanted molecules in addition to molecules to be separated pass, thus reducing separation factors. Therefore, in order to obtain membranes whose function as zeolite molecular sieves has been maximized by minimizing defects, various studies have been reported to reduce defects. Studies on reducing the generation of defects in a secondary growth process during membrane fabrication in which defects may occur and in a heat-based calcination process after membrane synthesis, and studies on a post-treatment method of reducing defects by introducing an additional process after membrane fabrication, have been actively conducted. The post-treatment method can increase the separation performance of a membrane by post-treatment even when the membrane has poor performance, and thus various methods therefor have been suggested (Maghsoudi, H., *Sep. Purif. Rev.* 2016, 45, 169-192).

Common post-treatment methods for improving the separation performance of zeolite membranes have a limitation in that it is difficult to distinguish between zeolite pores and defects. Non-selective post-treatment methods for these zeolite pores and defects have a disadvantage in that they block even the zeolite pores, and thus the flux is reduced more than necessary.

In order to minimize the disadvantages of the non-selective post-treatment methods for pores and defects, methods of selectively reducing only defects have recently attracted a lot of attention. Zeolite pores that are used for gas separation usually have a size smaller than ~0.8 nm, whereas fine defects that are generally formed have a size of ~1 nm or more, which differ from the size of the zeolite pores. Since zeolite pores and defects have significantly different sizes, only the defects can be selectively reduced using this size difference. Actually, studies based on this size difference have been reported, which block defects by selectively filling cationic particles larger in size than zeolite pores into the defects, or which reduce defects by causing organosilanes larger than zeolite pores to chemically react at the interface between polar and nonpolar solvents (Zhang, Y. et al. *J. Membr. Sci.* 2010, 358, 7-12).

Although the concomitant decrease in molar flux across a post-treated membrane is unavoidable because of the diminished transport through defects, several post-treatment approaches have successfully improved selectivity (Maghsoudi, H., *Sep. Purif. Rev.* 2016, 45, 169-192). For instance, silica precursors such as tetramethyl orthosilicate (TMOS; 0.89 nm, Nomura, M. et al., *Ind. Eng. Chem. Res.* 1997, 36, 4217-4223), tetraethyl orthosilicate (TEOS; 0.95 nm)(Kim, E. et al., *Environ. Sci. Technol.* 2014, 48, 14828-14836), and methyldiethoxysilane (MDES; 0.4 nm, Hong, Z. et al., *Ind. Eng. Chem. Res.* 2013, 52, 13113-13119;) are used to form silica on zeolite films in post-treatment processes. Such processes are expected to control the effective size of the zeolite pore and/or pore mouth via appropriate choice of the precursors while simultaneously blocking the defects. The CVD and CLD approaches have been shown to be effective for improving the separation performance. For example, the $CO_2/N_2$ separation factors (SF) increased from 2.5 to 7.5 for CHA membranes (Kim, E. et al., *Environ. Sci. Technol.* 2014, 48, 14828-14836) and from 1 to 15 for MFI membranes (Zhang, B. Q. et al., *Adv. Funct. Mater.* 2008, 18, 3434-3443), while the $H_2/CO_2$ perm-selectivity increased from 2.6 to 33 for DDR membranes (Zheng, Z. et al., *J. Mater. Sci.* 2008, 43, 2499-2502). In addition, it was reported that the selective blocking of defects, and thus the improvement in $CO_2$ perm-selectivity over $CH_4$, were achieved by the use of organic molecules of α-cyclodextrin and β-cyclodextrin in SAPO-34 membranes (Zhang, Y. et al., *J. Membr. Sci.* 2010, 358, 7-12).

The sizes of α-cyclodextrin (1.46 nm) and β-cyclodextrin (1.54 nm, Szejtli, J., *Chem. Rev.* 1998, 98, 1743-1753; Kalipcilar, H. et al., *Chem. Mater.* 2002, 14, 3458-3464) are larger than the pore size (0.38 nm) of SAPO-34 zeotypes so that they will selectively penetrate the defects. However, the cyclodextrins have problems in that they are very expensive, and have difficulty in blocking defects smaller than 1.46 nm because the size thereof is 1.46 to 0.54 nm. Silica dip-coating was reported for improving the p-/o-xylene separation performance of a MFI membrane via the selective repairing of cracks (Xomeritakis, G. et al., *Ind. Eng. Chem. Res.* 2001, 40, 544-552). Coke formation via a methanol-to-olefins reaction on SAPO-34 membranes was reported to selectively reduce defects in the membranes, thus improving the $H_2O$/2-propanol separation performance (Hirota, Y. et al., *J. Membr. Sci.* 2012, 415, 176-180). As revealed by these studies, selective deposition of fillers in the zeolitic pores and non-zeolitic, defective pores in a zeolite film is highly desirable for achieving high separation performance.

A SSZ-13 zeolite (chabazite zeolite; CHA) with a pore size of 0.37×0.43 $nm^2$ is a good candidate for separating $CO_2$ (0.33 nm) from slightly larger molecules, $N_2$ (0.364 nm) and $CH_4$ (0.38 nm), by its molecular sieving ability. Highly siliceous SSZ-13 zeolite membranes showed high $CO_2$ separation performance (Kalipcilar, H. et al., *Chem. Mater.* 2002, 14, 3458-3464; Kosinov, N. et al., *J. Membr. Sci.* 2015, 484, 140-145; Kosinov, N. et al., *J. Mater. Chem. A* 2014, 2, 13083-13092), which is suitable for selective $CO_2$ capture from the flue gas emitted by fossil fuel-based power plants or in the biogas upgrading process. However, despite the continuity under SEM resolution, CHA membranes sometimes do not provide good $CO_2$ perm-selectivity, mainly due to undesired nano-sized defects resulting from the calcination process (Zhang, Y. et al., *J. Membr. Sci.* 2010, 363, 29-35). Furthermore, a recent study (Kosinov, N. et al., *J. Mater. Chem. A* 2014, 2, 13083-13092) revealed that defects in CHA membranes were beneficial for achieving $CO_2$ perm-selectivity in the presence of $H_2O$ vapor in the feed. That is, $H_2O$ molecules were adsorbed on the defects existing in the CHA membranes and contributed to retrieval of the intrinsic high $CO_2$ separation performance, albeit with some flux reduction. For improving the $CO_2$ separation performance and realizing industrial applications, it is necessary to understand and control the defects in CHA membranes.

Accordingly, the present inventors have made extensive efforts to solve the above-described problems, and as a result, have found that when post-treatment of a zeolite membrane is performed using an inexpensive dye under mild conditions (room temperature and normal pressure), only the defects of the zeolite membrane can be selectively healed, the performance of the zeolite membrane can be improved, and a high-performance membrane having a high separation factor, particularly under dry conditions, can be achieved, thereby completing the present invention.

DISCLOSURE OF INVENTION

It is an object of the present invention to provide a method of post-treating a zeolite membrane, which can heal the defects in a defective zeolite membrane in an economic and simple manner.

Another object of the present invention is to provide a method of separating $CO_2$ by use of the post-treated zeolite membrane.

To achieve the above object, the present invention provides a method of post-treating a zeolite membrane, comprising a step of treating a defective zeolite membrane with a chemical material having a size larger than that of pores of the zeolite membrane and smaller than that of defects in the zeolite membrane, thereby selectively healing the defects in the zeolite membrane.

The present invention also provides a method of separating $CO_2$ from a mixture, which comprises $CO_2$ and a molecule selected from the group consisting of $CH_4$, $N_2$, $O_2$, $C_2H_4$, $O_2H_6$, $C_3H_6$ and $C_3H_8$, by use of the zeolite membrane post-treated by the above-described method.

BRIEF DESCRIPTION OF THE DRAWINGS

The patent or application file contains at least one drawing executed in color. Copies of this patent or patent application publication with color drawing(s) will be provided by the office upon request and payment of the necessary fee.

BEST MODE FOR CARRYING OUT THE INVENTION

Figure 1:
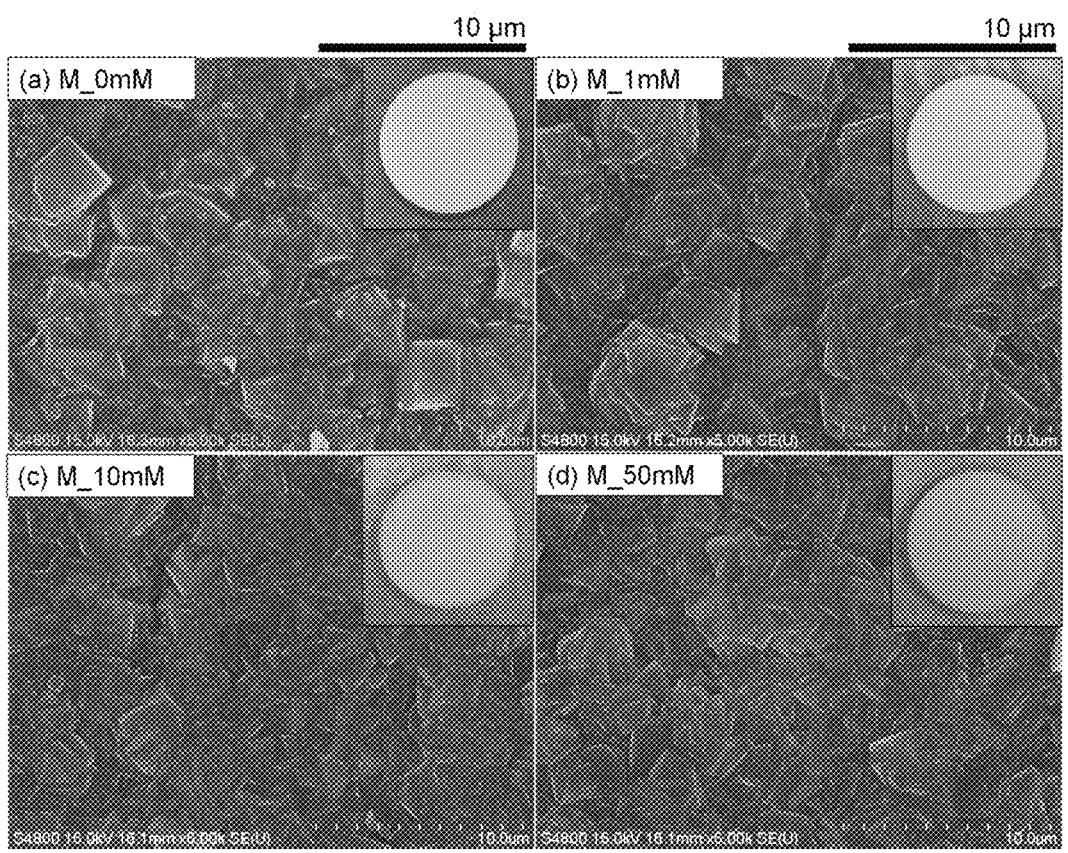
FIG. 1 shows SEM images of zeolite membranes post-treated with a dye according to an example of the present invention (M_xmM, x=(a) 0, (b) 1, (c) 10, and (d) 50). The photograph of each sample is shown in the upper right inset.

Unless defined otherwise, all the technical and scientific terms used herein have the same meaning as those generally understood by one of ordinary skill in the art to which the invention pertains. Generally, the nomenclature used herein and the experiment methods, which will be described below, are those well-known and commonly employed in the art.

The present invention introduces an easy and controllable post-treatment method, thereby suggesting a method which is capable of selectively reducing and controlling defects in a defective zeolite membrane such that the defects are little present.

Therefore, in one aspect, the present invention is directed to a method of post-treating a zeolite membrane, comprising a step of treating a defective zeolite membrane with a chemical material having a size larger than that of pores of the zeolite membrane and smaller than that of defects in the zeolite membrane, thereby selectively healing the defects in the zeolite membrane.

The chemical material may be a dye. The dye may be one or more selected from the group consisting of an anthraquinone dye, a triarylmethane dye, a xanthene dye, a phthalocyanine dye, a diarylmethane dye, an acridine dye, an azine dye, a thiazine dye, an oxazine dye, a cyanine dye, an azomethine dye, and an azo dye, and among them, the xanthene dye may be one or more selected from the group consisting of an eosin-based dye, a fluorescein-based dye, a rhodamine-based dye, a pyronine-based dye, a calcein-based dye, and a rosamine-based dye.

Preferably, the dye may be fluorescein sodium, Martius yellow, BBIH (2'-(4-Hydroxyphenyl)-5-(4-methyl-1-piperazinyl)-2,5'-bi(1H-benzimidazole) trihydrochloride), stilbene, 4-(Dicyanomethylene)-2-methyl-6-(4-dimethylaminostyryl)-4H-pyran)(DCM), or oxazole yellow.

Chemical Formula 1 below shows the chemical structure of a fluorescein sodium salt used as a dye reagent. The compound is an orange-red, highly soluble, odorless powder. The conjugated system of xanthene in the chemical form of the dye allows for absorption of light and causes light emission at a specific wavelength. The molecular size of the dye is ~1 nm, which is too large for the zeolite pores, but small enough to selectively block microdefects (<~2 μm).

[Chemical Formula 1]

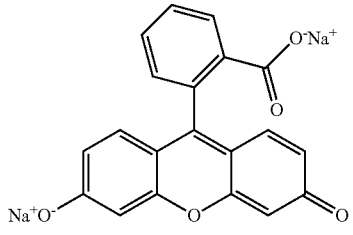

In the present invention, the dye may be selected from among Acid black 1, Acid blue 22, Acid blue 93, Acid fuchsin, Acid green, Acid green 1, Acid green 5, Acid magenta, Acid orange 10, Acid red 26, Acid red 29, Acid red 44, Acid red 51, Acid red 66, Acid red 87, Acid red 91, Acid red 92, Acid red 94, Acid red 101, Acid red 103, Acid roseine, Acid rubin, Acid violet 19, Acid yellow 1, Acid yellow 9, Acid yellow 23, Acid yellow 24, Acid yellow 36, Acid yellow 73, Acid yellow S, Acridine orange, Acriflavine, Alcian blue, Alcian yellow, Alcohol soluble eosin, Alizarin, Alizarin blue 2RC, Alizarin carmine, Alizarin cyanin BBS, Alizarol cyanin R, Alizarin red S, Alizarin purpurin, Aluminon, Amido black 10B, Amidoschwarz, Aniline blue WS, Anthracene blue SWR, Auramine O, Azocarmine B, Azocarmine G, Azoic diazo 5, Azoic diazo 48, Azure A, Azure B, Aazure C, Basic blue 8, Basic blue 9, Basic blue 12, Basic blue 15, Basic blue 17, Basic blue 20, Basic blue 26, Basic brown 1, Basic fuchsin, Basic green 4, Basic orange 14, Basic red 2 (safranin O), Basic red 5, Basic red 9, Basic violet 2, Basic violet 3, Basic violet 4, Basic violet 10, Basic violet 14, Basic yellow 1, Basic yellow 2, Biebrich scarlet, Bismarkck brown Y, Brilliant crystal scarlet 6R, Calcium red, Carmine, Carmine acid 4, Celestine blue B, China blue, Cochineal, Coelestine blue, Chrome violet CG, Chromotrope 2R, Chromoxane cyanin R, Congo Corinth, Congo red, Cotton blue, Cotton red, Crocein scarlet, Crocin, Crystal ponceau 6R, Crystal violet, Dahlia, Diamond green B, DiOC6, Direct blue 14, Direct blue 58, Direct red, Direct red 10, Direct red 28, Direct red 80, Direct yellow 7, Eosin B, Eosin bluish, Eosin, Eosin Y, Eosin yellowish, Eosinol, Erie garnet B, Eriochrome cyanin R, Erythrosine B, Ethyl eosin, Ethyl green, Ethyl violet, Evan's blue, Fast blue B, Fast green FCF, Fast red B, Fast yellow, Fluorescein, Food green 3, Gallein, Gallamine blue, Gallocyanin, Gentian violet, Haematein, Haematine, Haematoxylin, Helio fast rubin BBL, Helvetia blue, Hoffmann's violet, Imperial red, Indocyanin green, Ingrain blue, Ingrain blue 1, Ingrain yellow 1, INT, Kermes, Kermesic acid, Kernechtrot, Lac, Laccaic acid, Lauth's violet, Light green, Lissamine green SF, Luxol fast blue, magenta 0, magenta I, magenta II, magenta III, Malachite green, Manchester brown, Martius yellow, Merbromin, Mercurochrome, Metanil yellow, Methylene Azure A, Methylene Azure B, Methylene Azure C, Methylene blue, Methyl blue, Methyl green, Methyl violet, Methyl violet 2B, Methyl violet 10B, Mordant blue 3, Mordant blue 10, Mordant blue 14, Mordant blue 23, Mordant blue 32, Mordant blue 45, Mordant red 3, Mordant red 11, Mordant violet 25, Mordant violet 39, Naphthol blue black, Naphthol green B, Naphthol yellow S, Natural black 1, Natural red, Natural red 3, Natural red 4, Natural red 8, Natural red 16, Natural red 25, Natural red 28, Natural yellow 6, NBT, Natural red, New fuchsin, Niagara blue 3B, Night blue, Nile blue, Nile blue A, Nile blue oxazone, Nile blue sulfate, Nile red, Nitro BT, Nitro blue tetrazolium, Nuclear fast red, oil red O, orange G, Orcein, Pararosaniline, Phloxine B, phycobilins, Phycocyanins, Phycoerythrins, Phycoerythrincyanin (PEC), Phthalocyanines, Picric acid, Ponceau 2R, Ponceau 6R, Ponceau B, Ponceau de Xylidine, Ponceau S, Primula, purpurin, Pyronin B, Pyronin G, Pyronin Y, Rhodamine B, Rosanilin, Rose bengal, Saffron, Safranin O, violet R, violet red, Scharlach R, Shellac, Sirius red)F3B, Solochrome cyanine R, Soluble blue, Solvent black 3, Solvent blue 38, Solvent red 23, Solvent red 24, Solvent red 27, Solvent red 45, Solvent yellow 94, Spirit soluble eosin, Sudan III, Sudan IV, Sudan black B, Sulfur yellow S, Swiss blue, Tetrazine, Thioflavine S, Thioflavine T, Thionin, Toluidine blue, Toluidine red, Tropaeolin G, Trypaflavine, Trypan blue, Uranine, Victoria blue 4R, Victoria blue B, Victoria green B, water blue I, water soluble eosin, Xylidine Ponceau, and Yellowish eosin, and the dye may be any kind of dye having a size larger than that of the pores of the zeolite membrane and smaller than that of the defects.

The size of the dye may be 0.8-3 nm.

If a dye is used as the defect-blocking material in the present invention, the amount of dye that blocks the defects in the membrane may be measured by fluorescence confocal microscopy, and may be correlated with the degree of the defects.

In the present invention, the zeolite membrane may be treated with a dye having a size larger than that of the pores of the zeolite membrane and smaller than that of the defects, thereby plugging or blocking the defects.

In order to reduce defects which are formed during the synthesis or use of a zeolite membrane, a dye which is a simple and controllable way may be used to selectively block the defects in the zeolite membrane. Since the size of the dye is larger than that of zeolite pores and smaller than that of defects, the dye selectively diffuses to the defects. When the calcined zeolite membrane is exposed to a dye solution having a suitable concentration, only the defects will be reduced through size-selective diffusion. At this time, if the concentration of the dye solution used is controlled, the amount of defects reduced can be controlled.

The post-treatment according to the present invention may be performed under the room temperature and normal pressure conditions.

In addition, according to the present invention, a defective zeolite membrane may be post-treated, thereby controlling the defects such that the defects are little present. Furthermore, in previously reported literatures, the separation performance of a single zeolite membrane was measured only under wet conditions, whereas, in the present invention, the difference in separation performance between defective membranes and membranes having little defects as a function of the content of water in a feed to each of the membranes was analyzed. As a result, it was confirmed that, in the case of the non-defective hydrophilic NaY zeolite membrane and hydrophobic DDR zeolite membrane, the separation performance showed a tendency to decrease under wet conditions, whereas, in the case of the SSZ-13 (CHA zeolite type) having little defects, the permeance slightly decreased under wet conditions, but the separation factor showed a tendency to increase under wet conditions. In addition, it was confirmed that a membrane having little defects, obtained by post-treating the defective membrane, would be used as a high-performance membrane having a high separation factor under dry conditions.

Therefore, in another aspect, the present invention is directed to a method of separating $CO_2$ from a mixture, which comprises $CO_2$ and a molecule selected from the group consisting of $CH_4$, $N_2$, $O_2$, $O_2H_4$, $O_2H_6$, $O_3H_6$ and $C_3H_8$, by use of the zeolite membrane post-treated by the above-described method.

A SSZ-13 zeolite membrane selected as an example to which the post-treatment method is applied has a finite Si/Al ratio in the zeolite framework and has a CHA zeolite structure. The pore size of the CHA zeolite is 0.37×0.42 $nm^2$, which is larger than the size of carbon dioxide (0.33 nm) and similar to or smaller than the sizes of nitrogen (0.36 nm) and methane (0.38 nm). Based on selective carbon dioxide adsorption and the difference in pore size, the CHA zeolite membrane can separate a post-combustion flue gas ($CO_2/N_2$) or a biogas ($CO_2/CH_4$) in a methane purification process.

According to one preferred embodiment of the present invention, defects in the SSZ-13 zeolite membrane may be reduced by post-treatment with a fluorescein sodium salt. The post-treated SSZ-13 membrane showed significantly improved $CO_2/N_2$ and $CO_2/CH_4$ separation performances. The respective max $CO_2/N_2$ and $CO_2/CH_4$ SFs were as high as ~12.3 and ~100, which were 2-3 times higher than those of the intact SSZ-13 membranes. With increasing dye solution concentration, the corresponding $CO_2$ perm-selectivity was monotonically increased, indicating the presence of non-zeolite blocking toward the realization of intrinsic molecular sieving through SSZ-13 zeolites. Indeed, the quantitative analysis of defects presented for the intact SSZ-13 membranes revealed that a small portion of defects (less than 1%) accounted for more than 50% of the final $CO_2$ molar flux.

However, under wet conditions, the defect-healed M_50mM did not show any improvement in separation performance. Instead, the intact membrane (i.e., M_0mM), though it contained some degree of defects, showed higher separation performances. This indicates that defective zeolite membranes are suitable for $CO_2$ separation under wet conditions, because the defects were apparently blocked by the condensed and/or physisorbed water molecules. To comprehend the effect of $H_2O$ vapor in the feed stream, the present inventors conducted a $CO_2/N_2$ separation performance test at 50° C. by increasing the partial pressure of $H_2O$ vapor up to ~12 kPa. Owing to the hydrophobicity of the SSZ-13 membranes, the $CO_2/N_2$ separation performance at 50° C. under relative humidities up to 100% was well maintained for up to 72 hours. The present inventors found that some degree of defects in SSZ-13 membranes was rather helpful for attaining high $CO_2$ separation performance under wet conditions, while the significant reduction of defects allowed for improving the $CO_2$ perm-selectivity over $N_2$ or $CH_4$ under dry conditions.

In a preferred example of the present invention, in order to predict separation performance under simulated glue gas conditions containing water, previous literatures include feeding a gas containing water at room temperature and water vapor pressure and examining separation performance. At this time, the effect of water varies depending on the type and degree of hydrophilicity of zeolite. Specifically, hydrophilic zeolites show high separation performance under dry conditions, but show decreased separation factors and permeances under wet conditions because of the affinity between carbon dioxide and water molecules. On the other hand, hydrophobic zeolite membranes were reported to show the opposite result that the separation factor increases or decreases depending on the degree of defects under wet conditions (Gu, X. et al., *Ind. Eng. Chem. Res.* 2005, 44, 937-944; Kosinov, N. et al., *J. Mater. Chem. A* 2014, 2, 13083-13092; Himeno, S. et al., *Ind. Eng. Chem. Res.* 2007, 46, 6989-6997).

In the present invention, when it is applied to the post-treated membrane, the defects decrease under dry conditions of the inlet, and thus the flow of molecules that pass through the defects is blocked and the permeance decreases. However, since molecules pass only through portions that actually act as separation portions, the effect of increasing the separation factor can be obtained. This effect is obvious when the fed gas is under dry conditions. This is because the defects decrease, and thus only the inherent molecular sieve role of zeolite can be expected. According to the post-treatment method of the present invention, a high-performance membrane having a high separation factor under dry conditions can be achieved. However, under wet conditions, the defective membrane shows separation performance similar to or higher than that of the post-treated, defect-healed membrane. This is believed to be because the defects provide a space in which water is condensed.

In the present invention, the separation performance of a membrane when applied to an actual process can be predicted by measuring the separation performance under conditions similar to those of the actual processes. A post-combustion flue gas contains water vapor in an amount corresponding to the temperature of the flue gas. Usually, the flue gas typically has a temperature of 50° C. and a water vapor content of about 12%. In addition, a biogas which needs to be subjected to a methane purification process is discharged at a temperature of 40 to 70° C., and contains water vapor in an amount corresponding to this temperature. Thus, when a post-combustion flue gas or a biogas is to be separated, it is necessary to examine the effect of water. In the present invention, a mixed gas containing water was fed and the separation performance of the membrane under wet condition was examined. In addition, the separation performances of a defective membrane and a defect-free membrane under dry conditions and water conditions were comparatively measured, thereby determining the difference in the separation performance between the presence and absence of defects under wet conditions. At this time, under dry conditions, the defect-free membrane showed higher separation performance, but under wet conditions, the defective membrane showed rather higher separation performance. This is because the defects provide a space in which water can be condensed, thereby reducing the likelihood that the water is adsorbed into zeolite pores and blocks the pores.

EXAMPLES

Hereinafter, the present invention will be described in further detail with reference to examples. It will be obvious to a person having ordinary skill in the art that these examples are for illustrative purposes only and are not to be construed to limit the scope of the present invention.

Preparation Example 1

First, in order to synthesize SSZ-13 particles to be used as seeds, particles having a size of about 250 nm were obtained by modification of a previously reported method (U.S. Pat. No. 4,544,538).

The obtained particles were deposited on a support to form a seed layer. For secondary growth, according to a modification of a previously reported method, TMAdaOH (N,N, N-trimethyladamantylammonium hydroxide) and TEAOH (tetraethylammonium hydroxide), which are organic structural derivatives, were mixed at a suitable ratio and prepared (Zheng, Y. et al., *J. Membr. Sci.* 2015, 475, 303-310). The seed layer was placed in the prepared solution and subjected to hydrothermal synthesis. As a result, a SSZ-13 zeolite membrane could be obtained. The results of the SSZ-13 zeolite membrane before being subjected to post-treatment can be confirmed through SEM, XRD, and separation performance analysis.

Synthesis of SSZ-13 Seed Particles

SSZ-13 zeolite particles were synthesized by modifying a procedure of Kalipcilar, H. et al. (Kalipcilar, H. et al., *Chem. Mater.* 2002, 14, 3458-3464). A synthesis gel was prepared with a molar composition of 20 TMAdaOH: 100 $SiO_2$: 20 NaOH: 5 $Al(OH)_3$: 1,600 $H_2O$, with the minor difference being the amount of $H_2O$ (vs. 4000 $H_2O$ in Kalipcilar, H. et al., *Chem. Mater.* 2002, 14, 3458-3464). The resulting SSZ-13 particles were smaller than those reported in the literature, and their size was estimated to be 250 nm. For gel preparation, specified amounts of N,N,N-trimethyl-1-adamantanammonium hydroxide (TMAdaOH, 25 wt % aqueous solution, SACHEM Inc.), NaOH (98%, Sigma-Aldrich), silica source (LUDOX HS-40; 40 wt % suspension in $H_2O$, Sigma-Aldrich), and $Al(OH)_3$ (reagent grade, Sigma-Aldrich) were added to deionized (DI) water in sequence. The final synthesis gel was homogenized on a shaking machine (SI-300R, Lab Companion, South Korea) for 2 days at room temperature, and then transferred to a Teflon-lined autoclave. This was followed by a hydrothermal reaction at 160° C. for 7 days in a forced convection oven, which had been preheated to 160° C. After completion of the hydrothermal reaction, the solid particles were recovered by repeated centrifuging and washing with fresh deionized (DI) water. The recovered particles were further calcined at 550° C. at a ramp rate of 1° C.·min$^{-1}$ under an air flow of 200 mL·min$^{-1}$.

Synthesis of SSZ-13 Seed Layers and Membranes

Porous α-alumina discs with a thickness of ~2 mm and diameter of ~20 mm were used as supports. The α-alumina discs were lab-prepared by following a method of Choi, J. et al. (*Adsorption* 2006, 12, 339-360). For the formation of the SSZ-13 seed layers, the calcined SSZ-13 particles were deposited on top of α-alumina discs using dip-coating. For the dip coating, a seed suspension was prepared by adding ~0.05 g of the SSZ-13 particles to ~40 ml of ethanol and dispersing them by sonication for ~20 min (UC-10P, JEIO TECH, South Korea). One side of the α-alumina disc was smoothened by using a polisher (GLP-AP105, GLP Korea, South Korea) with sand paper and then contacted with the seed suspension for 30 s. The disc was withdrawn from the seed suspension and dried for 30 s under ambient conditions. This dip-coating procedure was repeated four times in order to uniformly cover the disc surface. Finally, SSZ-13 seed layers were calcined at 450° C. at a ramp rate of 1° C.·min$^{-1}$ under an air flow of 100 mL·min$^{-1}$.

Finally, SSZ-13 membranes were synthesized by hydrothermal growth of the prepared SSZ-13 seed layer based on a method of Zheng, Y. et al. (*J. Membr. Sci.* 2015, 475, 303-310). Specifically, a secondary growth gel was prepared with a molar composition of 15 TMAdaOH: 5 tetraethylammonium hydroxide (TEAOH): 100 SiO$_2$: 20 NaOH: 1 Al(OH)$_3$: 8,000 H$_2$O. The specified amounts of TMAdaOH, TEAOH (Alfa Aesar), NaOH, Al(OH)$_3$, and LUDOX HS-40 were sequentially added to deionized (DI) water. The gel was further mixed on the shaking machine for 1 day at room temperature. The seeded α-alumina disc was placed with the seeded side facing down, in a tilted position inside a Teflon liner, and the well-mixed secondary growth gel was added to the Teflon liner in an autoclave. A hydrothermal reaction was conducted under static conditions for 2 days in an oven preheated to 160° C. After completion of the hydrothermal reaction, the autoclave was quenched with tap water, and then, the as-synthesized SSZ-13 membranes were taken and immersed in distilled water to eliminate any impurities present in the membranes and dried at 100° C. overnight. The dried SSZ-13 membrane was calcined at 550° C. at a ramp rate of 0.5° C.·min$^{-1}$ under an air flow of 200 mL·min$^{-1}$ to remove the organic templates.

Dye-Based Post-Treatment on SSZ-13 Zeolite Membranes

Dye solutions with various concentrations (1, 10, and 50mM) were prepared. For solution preparation, a dye, fluorescein Na$^+$ salt (Sigma-Aldrich), was dissolved in DI water and stirred for 30 min. Hereinafter, the fluorescein sodium salt is denoted as a dye reagent.

Prior to the dyeing process, the calcined SSZ-13 membranes were dried at 100° C. at least overnight. The dried SSZ-13 membrane was placed in the middle of a beaker with the help of a Teflon tube, while its membrane side was faced downward. Then, the dye solution was poured into the beaker until the membrane sample was fully immersed. Subsequently, the beaker was sealed first with parafilm and fully wrapped with aluminum foil. After dyeing for 1 day, the SSZ-13 membranes were taken out of the beaker and dried under ambient conditions overnight. The SSZ-13 membranes were further dried at 160° C. at least overnight before the permeation test. For the sake of convenience, the resulting dyed membrane samples are referred to as M_xmM, where M represents the membrane sample and x indicates the concentration of the dye solution in mM (x=1, 10, and 50); accordingly, an intact SSZ membrane is denoted as M_0mM.

Example 1

In order to a dye-based post-treatment method, a dye to be used in fluorescence confocal microscopy was prepared at various concentrations. In the present invention, the dye was prepared at a concentration of 1 to 50mM. The SSZ-13 zeolite membrane synthesized by the method of Preparation Example 1 was immersed in the prepared dye solution for a predetermined time. Next, the membrane was taken out of the solution, and then dried at high temperature. The dye had a size of ~1 nm, and selectively penetrated the defects in the membrane. The dye present in the defects was observed by fluorescence confocal microscopy.

Dye-Based Post-Treatment on SSZ-13 Zeolite Membranes

Dye solutions with various concentrations (1, 10, and 50mM) were prepared. For solution preparation, a dye, fluorescein Na$^+$ salt (Sigma-Aldrich), was dissolved in DI water and stirred for 30 min. Hereinafter, the fluorescein sodium salt is denoted as a dye reagent.

Prior to the dyeing process, the calcined SSZ-13 membranes were dried at 100° C. at least overnight. The dried SSZ-13 membrane was placed in the middle of a beaker with the help of a Teflon tube, while its membrane side was faced downward. Then, the dye solution was poured into the beaker until the membrane sample was fully immersed. Subsequently, the beaker was sealed first with parafilm and fully wrapped with aluminum foil. After dyeing for 1 day, the SSZ-13 membranes were taken out of the beaker and dried under ambient conditions overnight. The SSZ-13 membranes were further dried at 160° C. at least overnight before the permeation test. For the sake of convenience, the resulting dyed membrane samples are referred to as M_xmM, where M represents the membrane sample and x indicates the concentration of the dye solution in mM (x=1, 10, and 50); accordingly, an intact SSZ membrane is denoted as M_0mM.

Characterizations of Dyed SSZ-13 Membranes

Scanning electron microscopy (SEM) images were obtained with a Hitachi S-4300 instrument. The surfaces of the particle and membrane samples were Pt-coated at a configuration of 15 mA for 100 s. X-ray diffraction (XRD) patterns were obtained on a Rigaku Model D/Max-2500V/PC diffractometer (Japan) with Cu K$_\alpha$ radiation (λ=0.154 nm). The simulated XRD pattern of CHA zeolite was duplicated by using Mercury software (available from the Cambridge Crystallographic Data Centre) with a crystallographic information file (CIF) of all-silica CHA zeolite. The CIF file was acquired from the International Zeolite Association (IZA; http://www.iza-online.org). In addition, FCOM images of the dyed SSZ-13 membranes were recorded along the membrane thickness by using a ZEISS LSM 700 confocal microscope with a solid-state laser (488 nm wavelength). The FCOM images were obtained by a method of Kim, E. et al. (*J. Mater. Chem.* A 2017, 5, 11246-11254), with a minor difference, i.e., by using an oil immersion objective lens instead of a water immersion objective lens. Variables such as source intensity and gain intensity for data acquisition were kept identical for all the samples to evaluate the defective structures in the membrane samples in a reliable manner.

Separation performance tests for $CO_2/N_2$ and $CO_2/CH_4$ mixtures were conducted using a home-made permeation system in the Wicke-Kallenbach mode, with the total pressures of both the feed and permeate sides held at ~1 atm. Detailed information related to the permeation test can be found in Kim, E. et al. (*Environ. Sci. Technol.* 2014, 48, 14828-14836). Under dry conditions, the partial pressures of $CO_2$ and $N_2$ (or $CH_4$) for the $CO_2/N_2$ and $CO_2/CH_4$ mixture feeds were 50.5 kPa and 50.5 kPa, respectively. The partial pressures of $CO_2$, $N_2$, (or $CH_4$) and $H_2O$ for the $CO_2/N_2$ and $CO_2/CH_4$ mixture feeds under wet feed conditions were maintained at 49 kPa, 49 kPa, and 3 kPa, respectively. In order to investigate the $CO_2/N_2$ separation performance of the membrane samples under different humidity conditions (0%, 26%, 60%, and 100%), the partial pressure of $H_2O$ vapor was increased from 0 kPa through ~3 kPa and ~7 kPa to ~12 kPa. In order to include the $H_2O$ vapor in the feed, equimolar $CO_2/N_2$ and $CO_2/CH_4$ mixtures were allowed to pass through a water-containing gas bubbler at different temperatures (25, 40, and 50° C. were used to generate 3, 7, and 12 kPa of $H_2O$ vapor, respectively). The flow rates of the feed binary mixture (dry basis) and the He sweep were maintained at ~100 mL·min$^{-1}$. For the internal standard required for reliable gas chromatographic analysis, ~5 mL·min$^{-1}$ of $CH_4$ for $CO_2/N_2$ mixtures and ~5 mL·min$^{-1}$ of $H_2$ for $CO_2/CH_4$ mixtures were added to the permeate stream carried by the He sweep gas toward the gas chromatograph (GC) column. A GC (YL 6100 GC system, YL Instruments, South Korea) installed with a packed column (6 ft×⅛" Porapak T) and a thermal conductivity detector (TCD) was used for the on-line analysis of the $CO_2/N_2$ permeates, while a GC (YL 6500 GC system, YL Instruments, South Korea) installed with a capillary column (30 m×0.320 mm GS-GasPro) and a pulsed discharge ionization detector (PDD) was used for the on-line analysis of the $CO_2/CH_4$ permeates.

Dyeing of SSZ-13 Membranes

Figure 14:
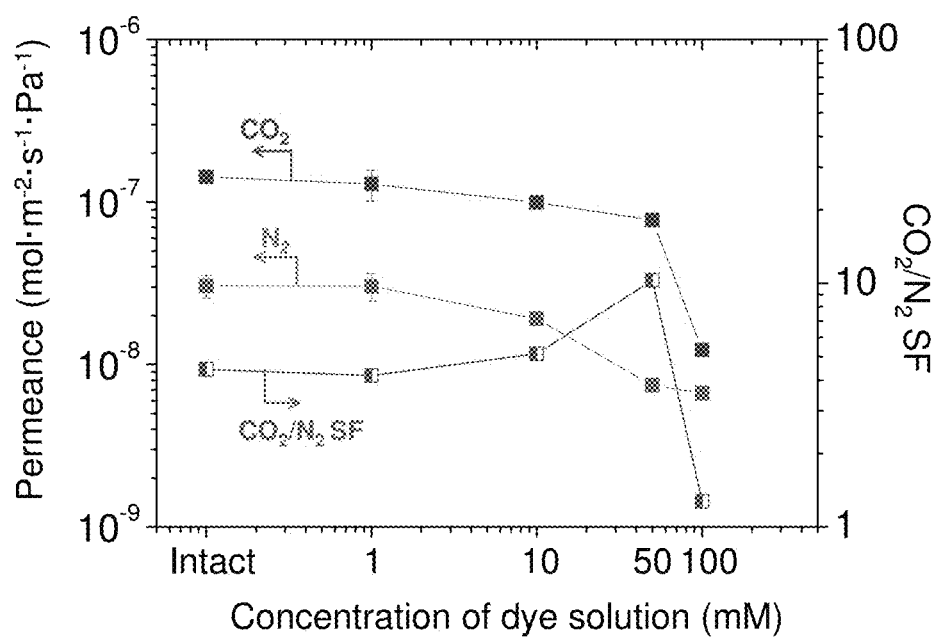
FIG. 14 is a graph showing the $CO_2/N_2$ separation performance of a membrane post-treated with a dye according to an example of the present invention, as a function of the concentration of the dye solution.

To find an upper bound of the concentration of the dye solution for valid defect healing, a dye solution with a higher concentration of 100mM was employed. The resulting M_100mM showed much degraded $CO_2/N_2$ separation performance with the $CO_2/N_2$ SF being as low as ~1, mainly due to the significantly decreased $CO_2$ permeance (FIG. 14). Since the $CO_2/N_2$ SF was theoretically estimated to reach ~20 through CHA zeolite membranes (Huang, Y. et al., *Angew. Chem. Int. Edit.* 2015, 54, 10843-10847), the $CO_2/N_2$ SF of M_100mM indicates undesired additional stacking of dye molecules on top of the zeolitic parts and accordingly, the marked loss in molecular sieving effect.

Characteristics of Dye-Treated SSZ-13 Membranes

Figure 11:
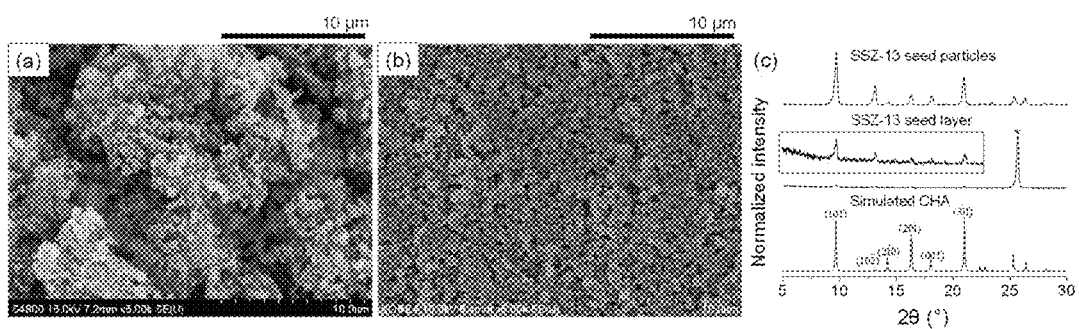
FIG. 11 shows SEM images of (a) SSZ-13 seed particles and (b) a SSZ-13 seed layer, and (c) XRD patterns of the SSZ-13 seed particles and seed layer as well as the simulated XRD pattern of all-silica CHA zeolite. The asterisk (*) indicates the XRD peaks from an α-$Al_2O_3$ disc.

SEM and XRD results (FIG. 11) show that a uniform SSZ-13 seed layer, which is further inter-grown toward a continuous SSZ-13 membrane, was obtained through compact packing of ~250-nm-sized SSZ-13 particles. FIG. 1a shows that the secondary growth of the SSZ-13 seed layer allowed for the continuous SSZ-13 membrane, comparable to conventional literature (Kalipcilar, H. et al., *Chem. Mater.* 2002, 14, 3458-3464; Kosinov, N. et al., *J. Membr. Sci.* 2015, 484, 140-145; Kosinov, N. et al., *J. Mater. Chem. A* 2014, 2, 13083-13092). In the present invention, highly siliceous (thus, hydrophobic) SSZ-13 zeolite membranes was manufactured to minimize the physical adsorption of dye molecules onto the membrane outer surface via their favored electrostatic interactions. In addition, the $CO_2/CH_4$ separation performance of a SSZ-13 zeolite membrane was improved monotonically with increasing Si/Al ratio and the resulting siliceous SSZ-13 zeolite membrane was beneficial for achieving high $CO_2$ separation under wet conditions (Kosinov, N. et al., *J. Membr. Sci.* 2015, 484, 140-145; Kosinov, N. et al., *J. Mater. Chem. A* 2014, 2, 13083-13092). In this dye-based post-treatment of the present invention, the role of the defects was decoupled from the combined effects of the zeolitic and non-zeolitic (i.e., defective) parts on the final $CO_2$ separation performance. In the present invention, the siliceous SSZ-13 membrane can serve as a good model for understanding the effect of defects on the perm-selectivity of a certain target molecule (here, $CO_2$) both under dry and wet feed conditions.

Dyeing of the SSZ-13 membranes was performed at varying concentrations of the dye solution (here, the concentrations of 1, 10, and 50mM were adopted. The color of an intact SSZ-13 membrane was white (inset of FIG. 1a). After completing the dyeing process, the dyed membranes became yellowish and the yellowish color deepened monotonically with increasing concentration of the dye solution (insets of FIG. 1b-1d). The surface morphology of the intact SSZ-13 membrane (i.e., M_0mM), equivalent to that of other reported SSZ-13 membranes of existing literature (Kalipcilar, H. et al., *Chem. Mater.* 2002, 14, 3458-3464; Kosinov, N. et al., *J. Membr. Sci.* 2015, 484, 140-145; Kosinov, N. et al., *J. Mater. Chem. A* 2014, 2, 13083-13092), was not noticeably changed even after post-treatment with dye solutions of concentrations 1, 10, and 50mM (FIG. 1). Considering the molecular size (~1 nm) of the dye, it was challenging to find any difference after the dyeing post-treatment under SEM resolution.

Figure 2:
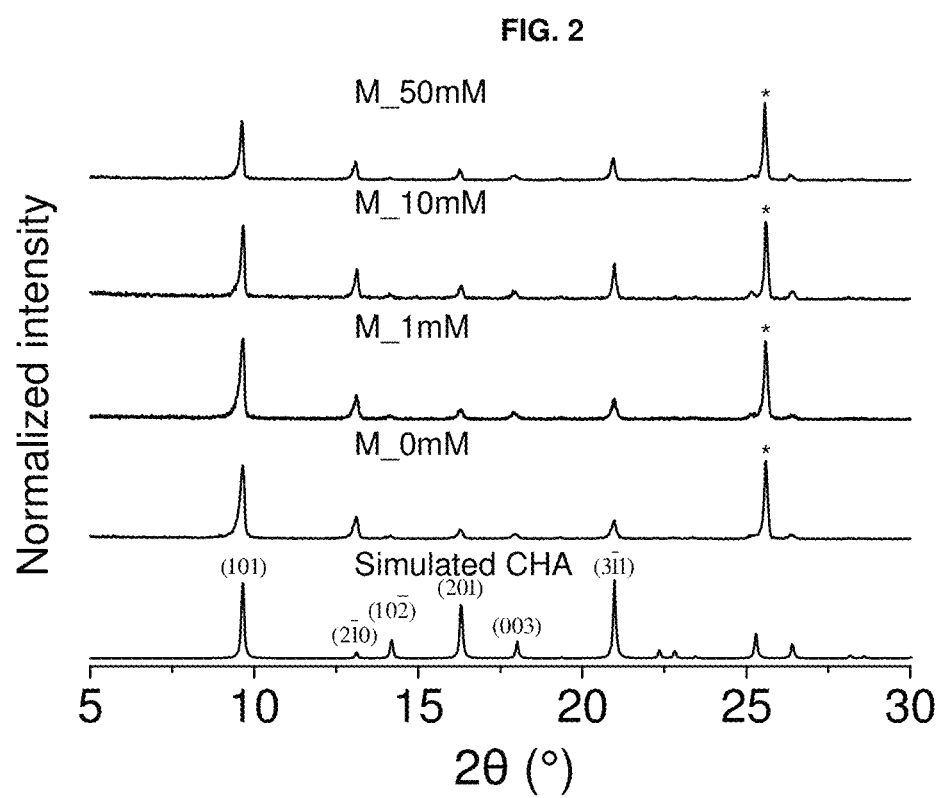
FIG. 2 shows XRD patterns zeolite membranes post-treated with a dye according to an example of the present invention (M_xmM, x=0, 1, 10 and 50). For comparison, a simulated XRD pattern of all-silica CHA zeolite is included at the bottom. The asterisks (*) indicate the XRD peaks from the α-$Al_2O_3$ disc.

In addition, the XRD pattern of M_0mM (FIG. 2) confirms that it comprised pure CHA zeolite. The XRD patterns of the other dyed SSZ-13 membranes (i.e., M_xmM; x=1, 10, and 50) were almost identical to that of M_0mM, which confirms their non-distinguishable morphologies as observed under SEM resolution (FIG. 1). Although the color difference between the intact and dyed SSZ-13 membranes was visible to the naked eye (insets of FIG. 1), neither SEM (FIGS. 1 and 11; a1-d1) nor XRD (FIG. 2) results could reveal any considerable difference between the intact and dyed SSZ-13 membranes, indicating that the dye post-treatment induced no structural change in the bulk scale and the dye molecules were highly dispersed on the top of the membrane surface.

Figure 12:
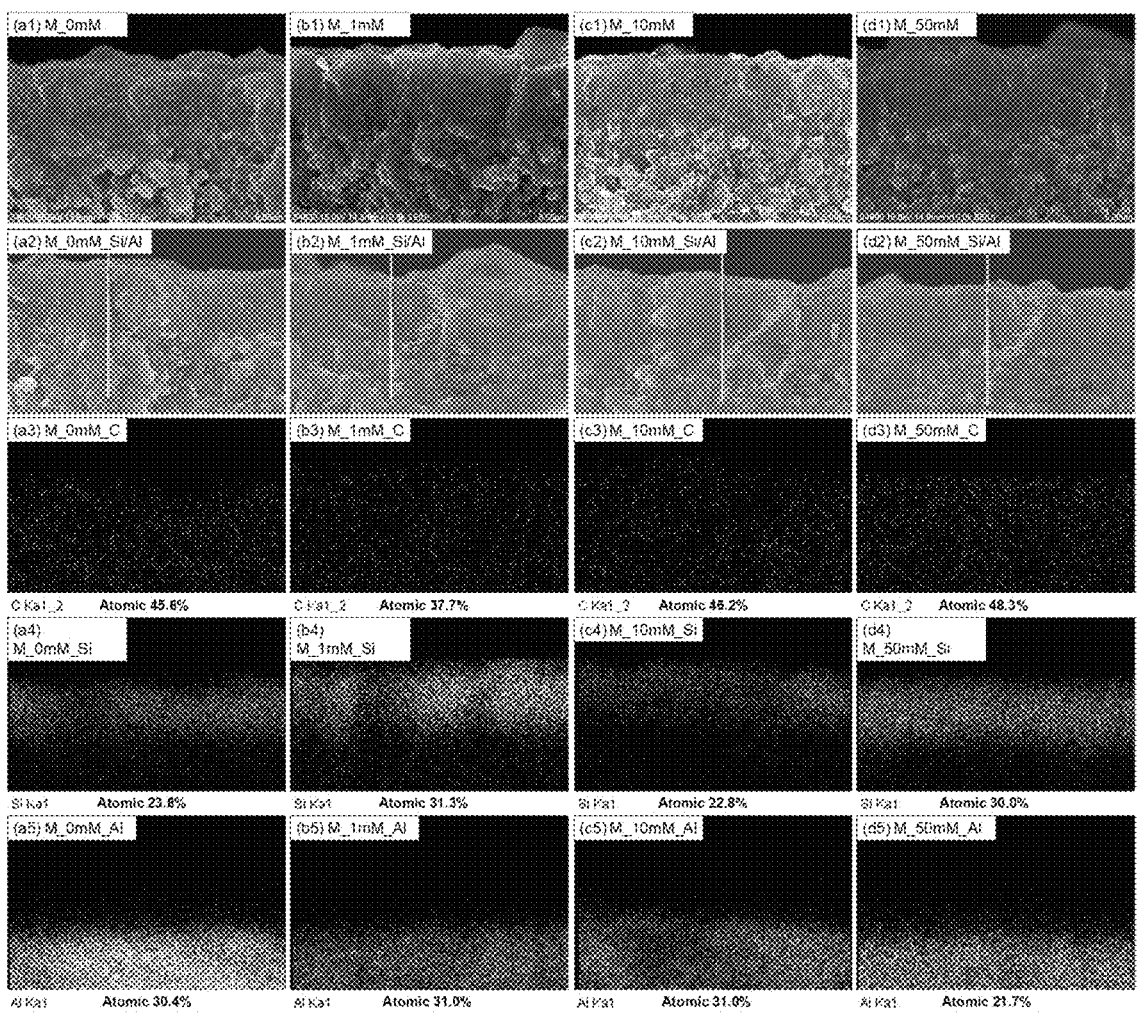
FIG. 12 shows cross-sectional view SEM images of membranes M_xmM (x=(a1) 0, (b1) 1, (c1) 10, and (d1) 50) post-treated with a dye according to an example of the present invention, (a2)-(d2) cross-sectional view SEM images along with the EDX results, which were obtained line scanning for the atoms of Si (cyan) and Al (red) atoms, and EDX results obtained from mapping of (a3)-(d3) C, (a4)-(d4) Si, and (a5)-(d5) Al atoms, respectively.

The EDX results via line scanning were further acquired in order to compare the Si and Al atom profiles and to evaluate the ratio of Si to Al atoms along the membrane thickness (FIG. 12; a2-d2). The intact SSZ-13 zeolite membranes were fabricated using a synthetic precursor with a nominal Si/Al ratio of 100, and the resulting SSZ-13 membrane was highly siliceous, with the corresponding Si/Al ratio being as high as ~70. The dyeing process did not change the chemical composition of the intact CHA membrane throughout the sample surface (Table 1) and thickness (FIG. 12; a2-d2).

TABLE 1

| Sample | Si/Al | Na/Al |
|---|---|---|
| M_0 mM | 68 ± 2.5 | 0.8 ± 0.4 |
| M_1 mM | 70 ± 4.2 | 0.5 ± 0.2 |
| M_10 mM | 65 ± 3.7 | 0.6 ± 0.3 |
| M_50 mM | 71 ± 3.5 | 0.7 ± 0.3 |

Figure 13:
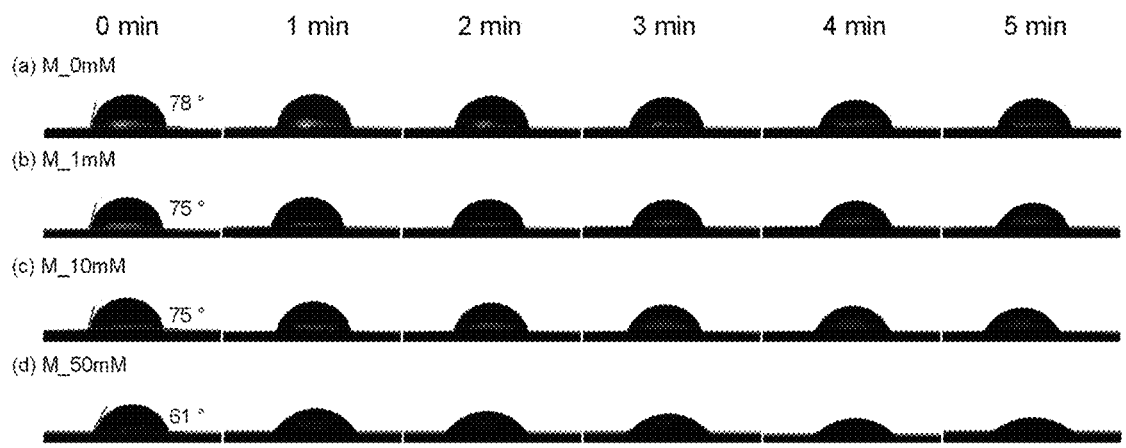
FIG. 13 shows water droplets on the top of the membrane surface in SSZ-13 membranes M_xmM (x=0, 1, 10, and 50) post-treated with a dye according to an example of the present invention, as a function of the contact time up to 5 min.

The reason that the actual Si/Al ratio in the membrane samples being lower than the nominal Si/Al ratio in the synthetic precursor is the undesired incorporation of additional Al atoms (plausibly, leached from the disc support) into the CHA framework of the membrane. To reveal any possible change in the hydrophobicity of membrane samples due to the dyeing process, the contact angle of a water droplet on each membrane sample was also measured. Given the inevitable adsorption of water droplets onto both zeolitic and non-zeolitic pores in a membrane, the water contact angles of all membrane samples (M_xmM; x=0, 1, 10, and 50) for up to 5 min (FIG. 13) were monitored. Considering that the contact angle of a water droplet in a hydrophobic zeolitic imidazolate metal-organic framework-8 (ZIF-8) was ~70°, the contact angles on M_xmM (x=0, 1, and 10) higher than 70° (FIG. 13) supported the fact that the surfaces of these films were considerably hydrophobic. In contrast, M_50mM, which was supposed to retain more dyes, was less hydrophobic than M_xmM (x=0, 1, and 10), suggesting that the water-soluble dye molecules accommodated the preferential wetting on membrane surface. In fact, the contact angles on membranes M_xmM (x=0, 1, and 10) did not change significantly with monitoring time (FIG. 13; a-c), though it was considerably decreased with measurement time in M_50mM. This gradual, pronounced decrease in contact angle with time in membrane M_50mM (FIG. 13d) also indicates continuous wetting associated with the dissolution of dye molecules.

The mappings of C, Si, and Al atoms were obtained through EDX measurements on the cross-sectional membrane samples (FIG. 12; a3-d3, FIG. 12; a4-d4, and FIG. 12; a5-d5). In particular, it was tried to detect any differences in carbon profiles due to the dye molecules trapped in the defects. However, the carbon profile or distribution obtained from the EDX mapping could not provide any meaningful clue as to the location and existence of the dye molecules for the dyed-membranes. This can be ascribed to the difficulty in preserving a carbon-free ambient environment because ubiquitous carbon sources can be easily deposited on all samples. Considering that a SEM instrument equipped with an EDX function is valid for quantifying chemical compounds of content over 0.1 wt %, the identification of carbon atoms, which were apparently present in very minor quantities among the majority of the Si and Al atoms in the membrane samples, was quite challenging. Instead, this result indicates the presence of a trace amount of the dye molecules, if any, inside the SSZ-13 membrane. Similar to the SEM and XRD results (FIGS. 1 and 2, respectively), the EDX mapping approach could not distinguish between intact and dyed SSZ-13 membranes.

Figure 3:
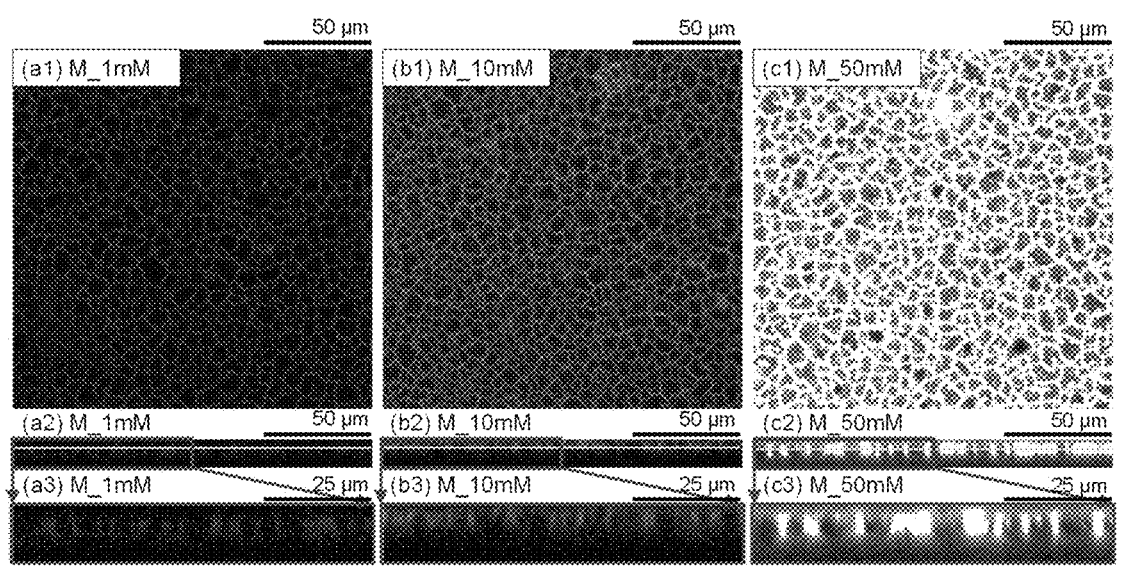
FIG. 3 shows FCOM top view images (a1-c1), cross-sectional view images (a2-c2) and enlarged FCOM cross-sectional view images (a3-c3) of zeolite membranes M_xmM (x=1, 10 and 50) post-treated with a dye according to an example of the present invention.

In addition, the defective structures of SSZ-13 membranes were investigated by visualizing them using a non-destructive FCOM analysis (Choi, J. et al., *Science* 2009, 325, 590-593; Bonilla, G. et al., *J. Membr. Sci.* 2001, 182, 103-109), because the overall separation performance of a zeolite membrane is a highly sensitive function of a minor non-zeolitic portion (Korelskiy, D. et al., *J. Mater. Chem. A* 2017, 5, 7295-7299; Karimi, S. et al., *J. Membr. Sci.* 2015, 489, 270-274). FIG. 3 shows the resulting top view and cross-sectional view FCOM images of M_xmM (x=1, 10, and 50). The crack densities in all the dyed membranes (M_xmM; x=1, 10, and 50) were comparable (FIG. 3; a1-c1), supporting the reliable synthesis of SSZ-13 membranes. Although the crack densities were similar in the three membranes, both brightness (i.e., fluorescent intensity) and width of cracks were monotonically increased with increasing concentration of the dye solution. This indicates that the amount of the defect-trapped dye molecules was monotonically increased with increasing concentration of the dye solution. At this point, the present inventors would like to mention that although the dyeing was originally attempted to visualize the defective structure, the same approach for improving membrane performance via the effective blocking of non-zeolitic or extrinsic defects was adopted.

Although the FCOM images in FIG. 3 provided qualitative information relevant to the defective structure, their appropriate image analysis will allow for quantifying the corresponding structural properties (mainly, tortousity and porosity). These properties can be used to estimate the molar flux of a permeating species through the defects in a membrane, and to elucidate the effect of defects on the final separation performance and extract a correlation between them.

Example 2

The defective membrane and the membrane whose defects were healed by the post-treatment method were measured for their $CO_2/N_2$ and $CO_2/CH_4$ separation performances under dry conditions and wet conditions. As a result, it was confirmed that, under dry conditions, the membrane whose defects were healed by the post-treatment method showed a higher separation factor, indicating that it exhibited higher separation performance. However, under wet conditions, the membrane having a very small amount of defects showed rather higher separation performance than the defect-healed membrane. This is believed to be because the defects rather provide a space in which water can condense, indicating that the water molecules less interfere with permeation through the zeolite pores.

Figure 4:
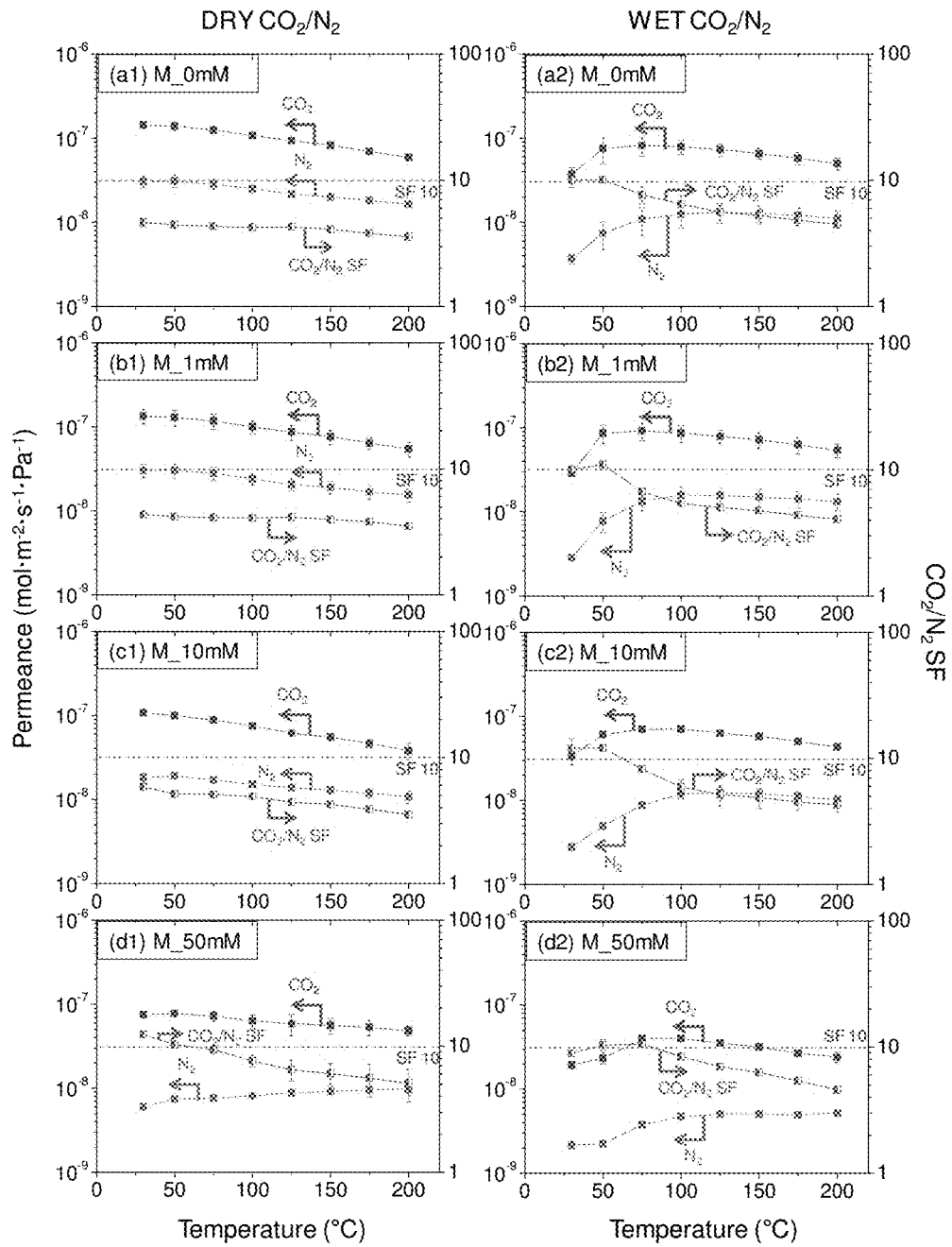
FIG. 4 depicts graphs showing the $CO_2/N_2$ separation performances of zeolite membranes post-treated with a dye according to one example of the present invention, as a function of temperature up to 200° C. under dry (left) and wet (right) conditions (M_xmM (x=(a1)-(a2) 0, (b1)-(b2) 1, (c1)-(c2) 10, and (d1)-(d2) 50)).
Figure 5:
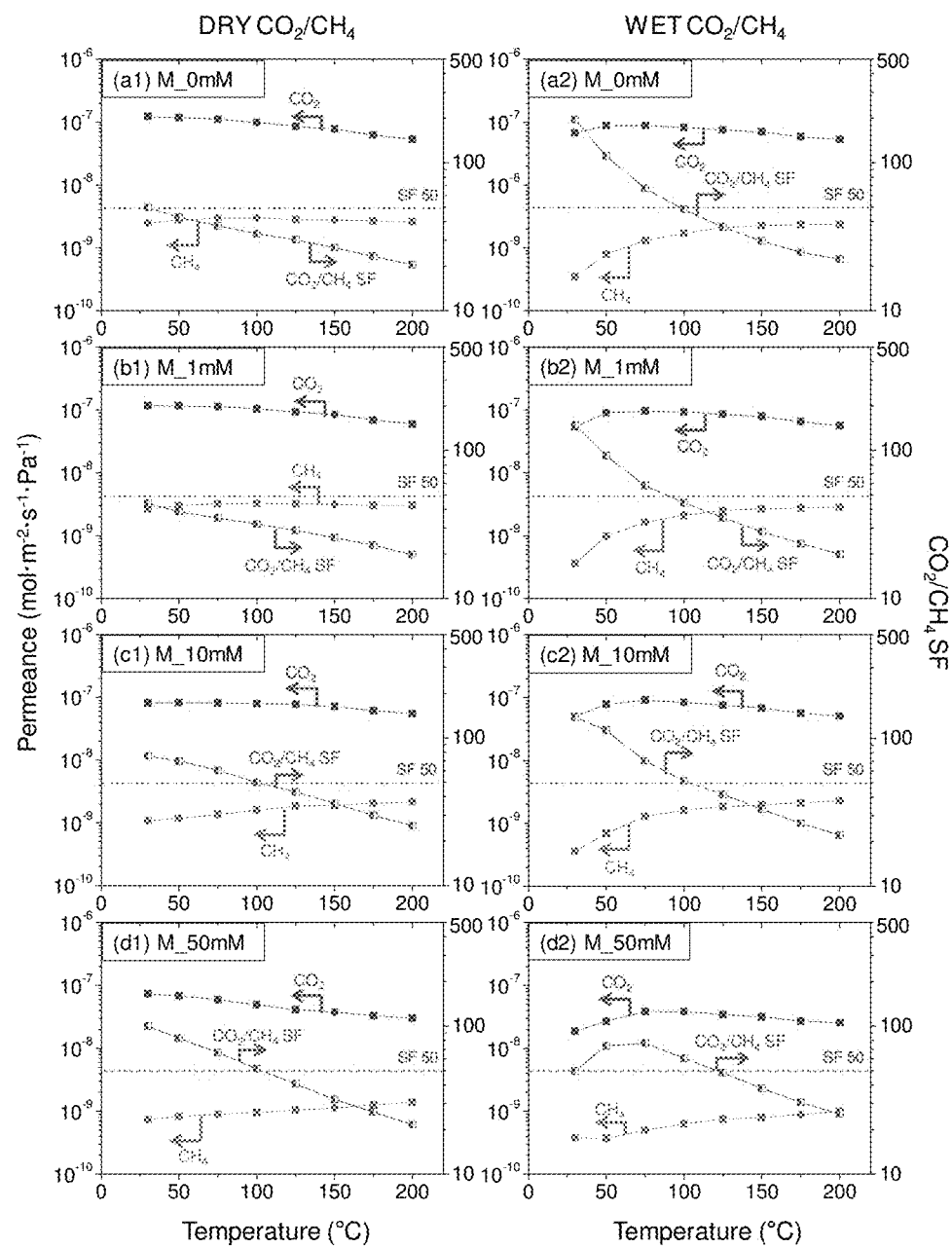
FIG. 5 depicts graphs showing the $CO_2/N_2$ separation performances of zeolite membranes post-treated with a dye according to one example of the present invention, as a function of temperature up to 200° C. under dry (left) and wet (right) conditions (M_xmM (x=(a1)-(a2) 0, (b1)-(b2) 1, (c1)-(c2) 10, and (d1)-(d2) 50)).

$CO_2/N_2$ and $CO_2/CH_4$ Separation Performances of Membranes Under Dry and Wet Conditions FIGS. 4 and 5 show the $CO_2/N_2$ and $CO_2/CH_4$ separation performances of all the membrane samples studied herein (M_xmM; x=0, 1, 10, and 50) under dry and wet conditions. FIG. 4 shows that the $CO_2/N_2$ SF and $CO_2$ permeance of M_1mM under dry conditions (FIG. 4; a1) was almost identical to those of M_0mM (FIG. 4; b1), suggesting that the dye concentration of 1mM was not sufficient to block the defects. For M_10mM, the maximum (max) $CO_2/N_2$ SF (5.8) under dry conditions was increased 1.3-fold and the corresponding $CO_2$ permeance was decreased by ~25% compared with the corresponding values for M_0mM. With further increase in dye concentration to 50mM, the max $CO_2/N_2$ SF was increased ~3-fold to become as high as 12.3 and the $CO_2$ permeance at 30° C. was decreased by approximately half of those of M_0mM. Such improvement in $CO_2/N_2$ SF resulted from the marked decrease in the permeance of the bulkier $N_2$ molecule, due to the effective reduction of defects, which originally provided a non-selective pathway. Here, it was further assumed that M_50mM was a defect-free SSZ-13 zeolite membrane because its max $CO_2/N_2$ SF of ~12 at 30° C. through alumina-supported SSZ-13 membranes could be corrected to be ~15 through pure SSZ-13 membranes. This value of ~15 was comparable to the simulated max $CO_2/N_2$ SF of ~20 (Krishna, R. et al., *Sep. Purif. Technol.* 2008, 61, 414-423) and the expected ideal $CO_2/N_2$ perm-selectivity of ~10 obtained using highly siliceous CHA type zeolite membranes (Kim, E. et al., *Environ. Sci. Technol.* 2014, 48, 14828-14836).

Despite the monotonic increase in $CO_2/N_2$ separation performance with increasing dye concentration up to 50mM (FIG. 14), it was found that such a trend did not hold for that in the presence of $H_2O$ vapor in the feed. Under wet conditions, the max $CO_2/N_2$ SFs of all four samples were in the comparable range of ~10-12 at 30-50° C. In particular, the $CO_2/N_2$ SFs (the max value of ~10) of the intact SSZ-13 membrane (i.e., M_0mM) under wet conditions were increased compared to those under dry conditions (max value of ~4.6) measured at temperatures up to 200° C. This trend was in good agreement with the permeation behavior of reported SSZ-13 membranes (Kosinov, N. et al., *J. Mater. Chem. A* 2014, 2, 13083-13092). The dyed membranes (M_xmM; x=1 and 10) showed a similar tendency (FIG. 4; b1-b2 and c1-c2). However, the $CO_2/N_2$ separation performance of M_50mM was distinctly different between dry and wet conditions (FIG. 4; d1-d2). First, the $CO_2/N_2$ SF at 30° C. was decreased from 12.3 under dry conditions (FIG. 4; d1) to 9.0 under wet conditions (FIG. 4; d2), while the corresponding $CO_2$ permeance was decreased approximately by half. Second, max $CO_2/N_2$ SFs under wet conditions (~10.4-10.5) were observed at 50-75° C., not at 30-50° C., where max SF values were observed for the other three samples (FIG. 4; a2-c2). The effective repairing of the defects in M_50mM (max SF of 12.3 in FIG. 4d1 vs. 4.6 of the intact membrane in FIG. 4a1) appeared beneficial for achieving the $CO_2/N_2$ SF at a higher temperature of 75° C. The permeation tests of the dyed and intact SSZ-13 membranes reveal that the non-zeolitic defects were beneficial for achieving high molecular sieving for $CO_2$ perm-selectivity in the presence of $H_2O$ vapor. For M_0mM, the much-increased $CO_2/N_2$ SF (~10) under wet conditions (against 4.6 under dry conditions) suggests that since defects in a hydrophobic M_0mM (FIG. 13) were selectively occupied by water molecules, the resulting membrane could achieve high $CO_2/N_2$ separation performance. On the contrary, since the defects in M_50mM were already filled with the dye molecules, water molecules were likely to be adsorbed on top of the zeolitic parts of the relatively less hydrophobic surface of M_50mM (as reflected by the lower water contact angle in FIG. 13). Surprisingly, the formation of a water droplet on hydrophobic M_0mM was well preserved despite some degree of defects, while water molecules on the less hydrophobic surface of M_50mM were well spread throughout the surface with time (FIG. 13), supporting prevailing wetting of the top surface of M_50mM.

In addition to the $CO_2/N_2$ separation performance, the $CO_2/CH_4$ separation performances of the four samples under dry and wet conditions were measured (FIG. 5). As observed for the $CO_2/N_2$ separation performance (FIG. 4), the max $CO_2/CH_4$ SF under dry conditions was observed at ~30° C.; its value was increased from 50 for M_0mM through 44 for M_1mM and 75 for M_10mM to 100 for M_50mM (FIG. 5; a1-d1). Notably, the dyeing post-treatment imparted the max $CO_2/CH_4$ SF of ~100 at 30° C., which was almost double of that (50) for M_0mM. In addition, the $CO_2/CH_4$ separation performance under wet conditions (FIG. 5; a2-d2) showed a pattern similar to that found for the $CO_2/N_2$ separation performance (FIG. 4; a2-d2). The only minor difference for M_xmM (x=0, 1, and 10) was that the max $CO_2/CH_4$ SF appeared at 30° C., while the max $CO_2/N_2$ SF was observed at 30-50° C. Such a trend can be attributed to the stronger adsorption of water molecules at the lower temperature of 30° C., where the $CH_4$ molecules (0.38 nm), larger than $N_2$ molecules (0.364 nm), were unlikely to penetrate into the SSZ-13 zeolite pores. This suggests that the transport of $CH_4$ molecules was disfavored by the physisorbed water molecules on the membrane surface. Interestingly, it was also found that the $CO_2$ separation performance of M_50mM under wet conditions was lower than those of M_xmM (x=0, 1, and 10). Among them, the intact SSZ-13 membrane (i.e., M_0mM) showed the highest separation performance with the max $CO_2/CH_4$ SF as high as ~195 at 30° C. This strongly supports that the non-zeolitic defects play a beneficial role in achieving the high $CO_2$ perm-selectivity in the presence of $H_2O$ vapor in the feed. This occurred seemingly because the physisorbed water in the zeolitic parts blocked the defects and retarded the molar flux of the slowly permeating species (here, $CH_4$) through the non-selective defects, thus helping to recover an intrinsic molecular sieving ability through the zeolitic-parts.

Figure 6:
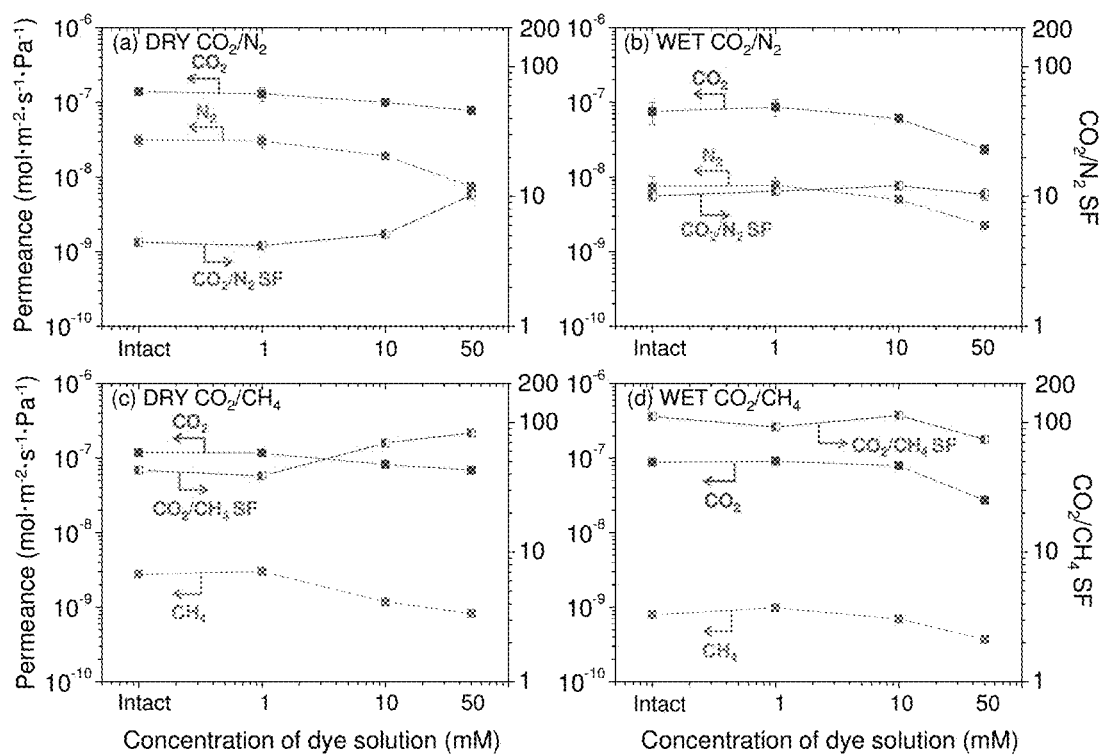
FIG. 6 depicts the $CO_2/N_2$ separation performance ((a)-(b)) $CO_2/CH_4$ separation performance ((c)-(d)) of zeolite membranes M_xmM (x=0, 1, 10 and 50) post-treated with a dye according to an example of the present invention, at 50° C. under dry (left) and wet (right) conditions as a function of the concentration of dye solution.

For better comparison, in FIG. 6, the $CO_2/N_2$ and $CO_2/CH_4$ separation performances were summarized at 50° C. under dry and wet conditions as a function of the dye solution concentration (0, 1, 10, and 50mM). Apparently, the dry $CO_2$ perm-selectivity through dyed SSZ-13 membranes was increased monotonically with increasing dye concentration. As discussed above, the intact SSZ-13 membranes showed higher $CO_2$ perm-selectivities over both $N_2$ and $CH_4$ under wet conditions. However, M_50mM, which was assumed to be defect-free due to defect blockage by the dye molecules, provided comparable $CO_2/N_2$ and $CO_2/CH_4$ SFs under dry and wet conditions. Interestingly, the permeances of all the permeating components through M_0mM were decreased to a similar degree with respect to those under dry conditions. Along with this similar permeance reduction pattern in M_50mM, its wet $CO_2/N_2$ and $CO_2/CH_4$ SFs were close to those in M_0mM, with the only difference being the lowered permeances (FIGS. 6b and 6d). These combined features reveal that the adsorbed water molecules spread on the membrane surface of M_50mM hindered the transport of all permeating components without improving perm-selectivity.

Figure 7:
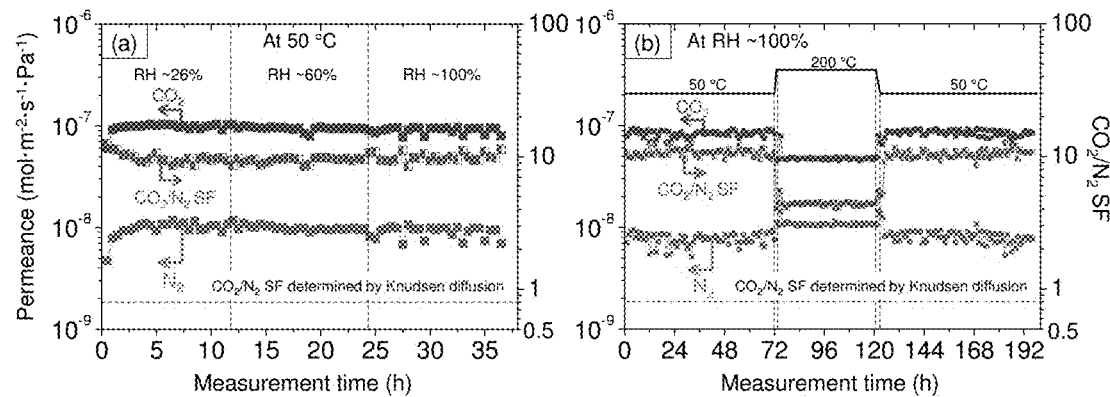
FIG. 7(*a*) shows the effect of relative humidity (~26-100%) on the $CO_2/N_2$ separation performance of M_0mM at 50° C. for zeolite membranes post-treated according to an example of the present invention, and FIG. 7(*b*) shows the results of long-term stability test of M_0mM with respect to the equimolar $CO_2$ and $N_2$ mixture under wet conditions (~12 kPa $H_2O$ vapor).
Figure 15:
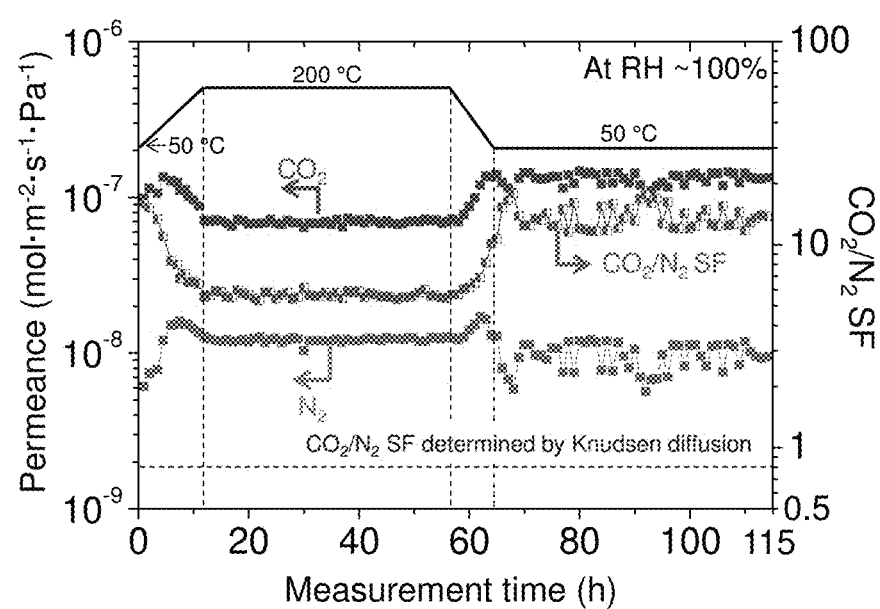
FIG. 15 is a graph showing the long-term test of the $CO_2/N_2$ separation performance of membrane M_0mM post-treated with a dye according to an example of the present invention, for the simulated flue gas composition (13.4 kPa $CO_2$, 12 kPa $H_2O$ vapor, and 75.6 kPa $N_2$).

It was also attempted to figure out the effect of $H_2O$ vapor on the $CO_2/N_2$ separation performance of M_0mM at the representative flue gas temperature of 50° C. (FIG. 7). For this purpose, the relative humidity (RH) was gradually increased from 26% through 60% to 100% at 50° C. The intact SSZ-13 membrane (M_0mM) was chosen because it showed the highest $CO_2$ perm-selectivity under wet conditions (FIG. 6). Since the flue gas stream usually contained saturated $H_2O$ vapor of ~12 kPa, the variation of its partial pressure from 3 kPa (RH 26%) through 7 kPa (RH 60%) up to 12 kPa (RH 100%) helped to elucidate the permeation behavior of M_0mM. FIG. 7a shows that M_0mM attained high $CO_2/N_2$ separation performance under wet conditions and well preserved its performance regardless of the relative humidity at 50° C. The fact that the effect of $H_2O$ vapor on the performance M_0mM was rather insensitive supports the effective, reliable use of hydrophobic SSZ-13 membranes for practical carbon capture processes. To the best of our knowledge, such high $CO_2/N_2$ separation performance of a zeolite membrane with respect to more realistic flue gas streams was reported for the first time. Despite the saturated pressure of ~12 kPa at the representative flue gas temperature of 50° C., many studies have reported good $CO_2$ separation performance of zeolite membranes at ~3 kPa of $H_2O$ vapor, apparently due to easier handling of $H_2O$ vapor on the lab scale (Kosinov, N. et al., *J. Mater. Chem. A* 2014, 2, 13083-13092; Himeno, S. et al., *Ind. Eng. Chem. Res.* 2007, 46, 6989-6997). In contrast, a hydrophilic NaY (FAU type; Si/Al ratio of ~1.7-1.8) zeolite membrane showed very poor separation performances (Boddenberg, B. et al., *Phys. Chem. Chem. Phys.* 2002, 4, 4172-4180), because its powder form zeolite (Si/Al ratio of ~2.4) had extremely high affinity for $H_2O$ adsorption even under very low partial pressure (as low as 0.01 kPa) (Boddenberg, B. et al., *Phys. Chem. Chem. Phys.* 2002, 4, 4172-4180). Furthermore, a long-term stability test of the performance using M_0mM was conducted at 50° C. and the saturated $H_2O$ vapor of ~12 kPa for up to 6 d (FIG. 7b). This is highly desirable for ensuring its availability for practical purposes. In particular, M_0mM was exposed to a harsh feed condition of 200° C. for ~2 d to simulate long-term use. FIG. 7b reveals that its separation performance was remarkably well preserved without any recognizable degradation, supporting the superior performance of the intact, siliceous, and hydrophobic SSZ-13 membranes. It should be emphasized that the intact SSZ-13 membrane also showed high $CO_2/N_2$ performance with respect to the simulated flue gas conditions (partial pressures of $CO_2$, $N_2$, and $H_2O$ vapor being 13.4 kPa, 75.6 kPa, and 12 kPa, respectively, at 50° C.) (FIG. 15). Desirably, the resulting $CO_2/N_2$ SF of 13.7±1.8 at 50° C. (FIG. 15) was slightly higher than the counterpart of 10.5±0.7 with respect to an equimolar $CO_2/N_2$ mixture (FIG. 7b). These similar $CO_2/N_2$ SFs can be ascribed to the linear adsorption behavior of both $CO_2$ and $N_2$ molecules inside the CHA zeolites (Kim, E. et al., *Environ. Sci. Technol.* 2014, 48, 14828-14836). The long-term stability results demonstrated that hydrophobic zeolite membranes with some defects were conceptually desirable for securing marked $CO_2$ capture ability under water-containing feed conditions.

Figure 16:
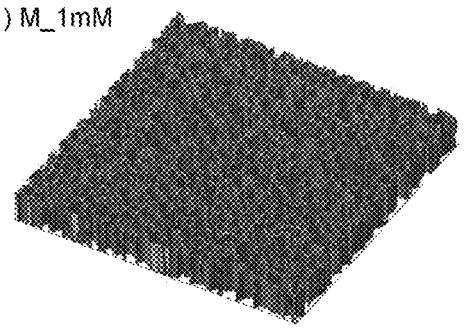
FIG. 16 shows tilt-view (left) and top-view (right) images obtained through imaging processing of the FCOM images of M_xmM ((a1)-(a2) x=1, (b1)-(b2) x=10, and (c1)-(c2) x=50), which are shown in FIG. 3.
Figure 16:
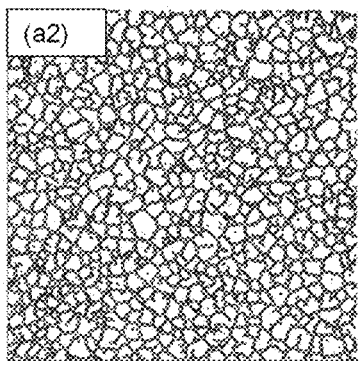
Figure 16:
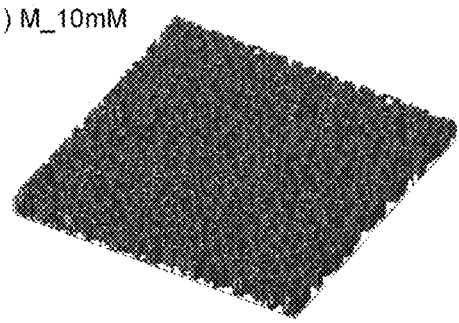
Figure 16:
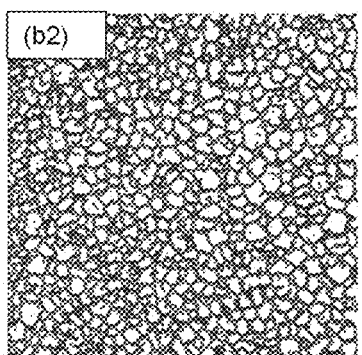
Figure 16:
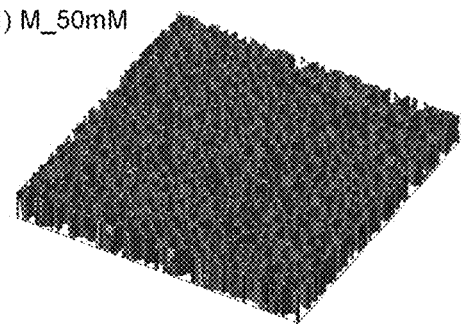
Figure 16:
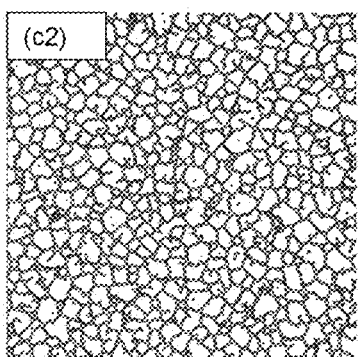

Correlation of the Properties of Defective Structures with the $CO_2$ Molar Flux Across the Membranes FIG. 3 shows that the original FCOM images were mainly composed of black and white spots. FIG. 16 shows the schematic of the defective structure, obtained by processing the FCOM images. Such image processing provided unique quantitative features of the defective pore structures (mainly in terms of tortuosity and porosity), which could not be acquired otherwise. Detailed information relevant to the tortuosity and porosity is summarized in Table S1. Considering the tortuosity along the z-axis (i.e., the direction of membrane thickness), it was tried to account for the $CO_2$ molar flux across a SSZ-13 membrane using a Maxwell-Stefan equation. Accordingly, it could be estimated the diffusivity of $CO_2$ that passed through a defect-free SSZ-13 zeolite membrane (here, M_50mM was assumed to be a defect-free SSZ-13 membrane) to be $1.26 \times 10^{-11}$ $m^2 \cdot s^{-1}$.

Figure 8:
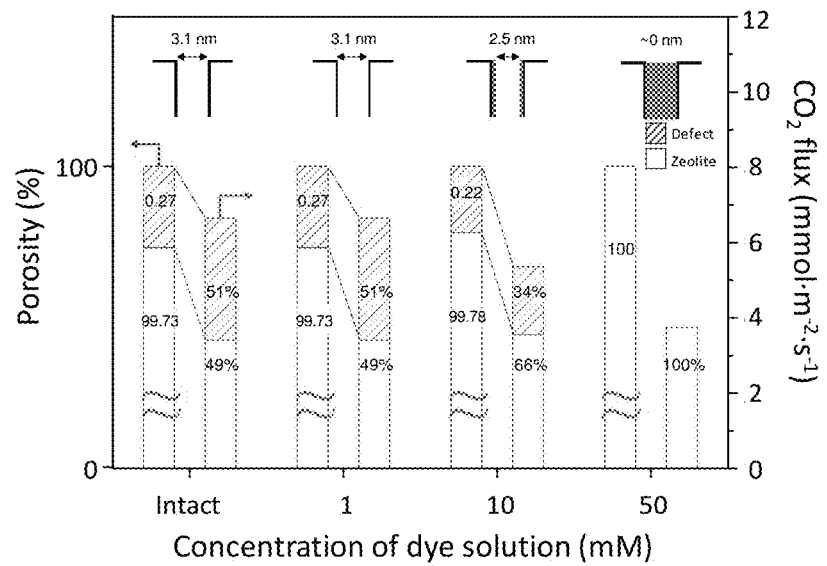
FIG. 8 shows the porosity of non-zeolitic parts (i.e., defects) and zeolitic part of the present inventions, and their corresponding contribution to the total $CO_2$ molar fluxes for M_xmM (x=0, 1, 10, and 50). M_0mM and M_50mM were assumed to be an 100% defective membrane and a 0% defect-free membrane, respectively.

In addition, flux assessment with an assumption that the fluxes through zeolitic and non-zeolitic parts can be linearly combined reveals that the size and porosity of the defects were estimated to be 3.1 nm and 0.27%, respectively (FIG. 8). Surprisingly, this result shows that the molar flux through the defects with porosity of 0.27% accounted for up to 51% of the total molar flux (FIG. 8). In other words, the defects, although present in a very minor portion (here, ≤1%), could provide facile, non-selective pathways to all permeating components, thereby worsening the membrane separation performance. The same calculation protocol was extended to other membranes (M_xmM; x=1 and 10), resulting in the estimation of the defect size and $CO_2$ molar flux through the defects. For M_1mM, results similar to those of M_0mM were obtained, as expected from almost the identical separation performance shown in FIG. 4 (a1-b1). This indicates that the defects in M_1mM were hardly blocked by the dye molecules. However, dyeing with the 10mM dye solution resulted in decreasing both the defect size from 3.1 nm to 2.5 nm and the porosity from 0.27% to 0.22%. Concomitantly, the portion of passing through the zeolites membrane in the total flux decreased from 51% to 34% (FIG. 8).

Quantitative flux assessment suggested that the defects, present in the range of 0.2-0.3%, accounted for 30-50% of the total flux in M_xmM (x=0, 1, and 10) (FIG. 8). This finding was in good agreement with previous studies (Korelskiy, D. et al., *J. Mater. Chem. A* 2017, 5, 7295-7299; Karimi, S. et al., *J. Membr. Sci.* 2015, 489, 270-274). For example, Korelskiy and co-workers reported that 2% of defects in a MFI membrane accounted for ~30% of the total flux. Karimi et al. stated that 10% of the total He flux through a MFI type zeolite membrane passed through the defects (content of ~0.2%). Therefore, the removal of non-zeolitic defects is essential for realizing the intrinsic properties of zeolite membrane constituents in a membrane form and apparently for ensuring its molecular sieving-based separation performance. Herein, the post-treatment based on the dyeing process provided different degrees of healing or blocking defects and accommodated a systematic variation in the dependence of permeation rates on the defects. This approach helps provide a platform to elucidate the effect of the defects on the perm-selectivity of a certain molecule.

Figure 9:
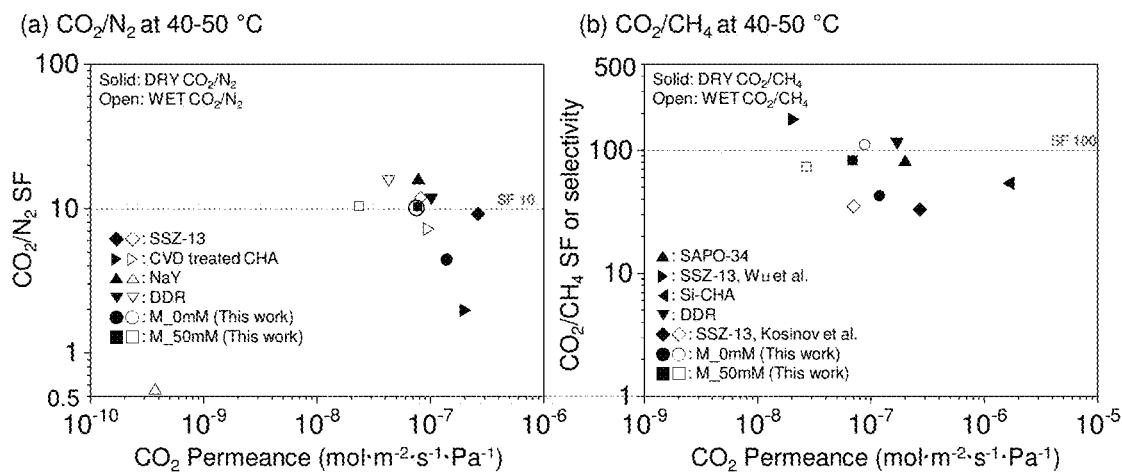
FIG. 9 shows $CO_2/N_2$ SFs vs. $CO_2$ permeances (a) and $CO_2/CH_4$ SFs vs. $CO_2$ permeances (B) for M_0mM and M_50mM according to an example of the present invention along with those of other zeolite membranes according to a conventional art.
Figure 10:
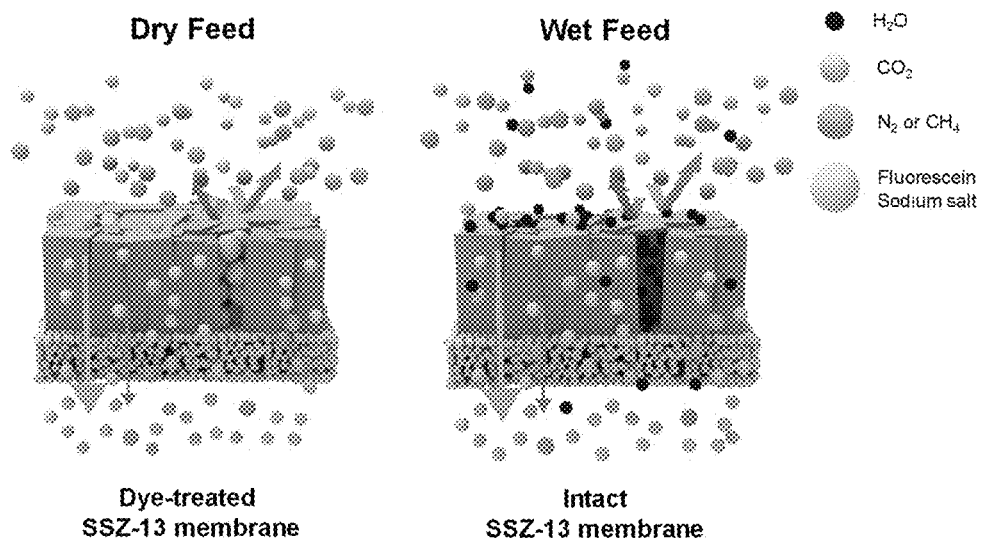
FIG. 10 schematically shows gas separation processes under dry and wet conditions of a SSZ-13 membrane post-treated with a dye according to an example of the present invention and a non-post-treated membrane.

Comparison of $CO_2/N_2$ and $CO_2/CH_4$ Separation Performances with Other Literatures As a final attempt to evaluate membrane performance, the $CO_2/N_2$ and $CO_2/CH_4$ separation performances of M_0mM (with some amount of defects) and M_50mM (plausibly with no defects) were compared with those of other reported membranes. The resulting comparison with respect to the $CO_2/N_2$ mixtures (FIG. 9a) indicates that some defects in M_0mM (mainly cracks as shown in FIG. 3) were desirable for achieving the marked $CO_2/N_2$ SF as high as ~10 with modest $CO_2$ permeance. Considering the representative temperature of the flue gas (~50° C.) from the coal-fired power plant (Merkel, T. C. et al., *J. Membr. Sci.* 2010, 359, 126-139), the $CO_2/N_2$ separation performance measured in the similar temperature range (40-50° C.) was collected and illustrated in FIG. 9a. In particular, the separation performances between dry and wet conditions were also compared to comprehend the effect of water on the performance. FIG. 9a shows that most membranes had higher $CO_2/N_2$ SFs under dry conditions compared to wet conditions, except for the hydrophilic NaY membranes (Gu, X. H. et al., *Ind. Eng. Chem. Res.* 2005, 44, 937-944). The hydrophilic NaY zeolite membranes showed very poor (actually, almost null) separation performances under wet conditions, mainly due to the inhibition of $CO_2$ permeation by strongly and copiously adsorbed water (Boddenberg, B. et al., *Phys. Chem. Chem. Phys.* 2002, 4, 4172-4180). On the contrary, siliceous SSZ-13 (Kosinov, N. et al., *J. Mater. Chem. A* 2014, 2, 13083-13092), DDR (Kim, E. et al., *J. Mater. Chem. A* 2017, 5, 11246-11254), and CVD-treated CHA membranes (Kim, E. et al., *Environ. Sci. Technol.* 2014, 48, 14828-14836) had a different trend in that they showed high $CO_2/N_2$ SFs under wet conditions. Among them, the CVD-treated CHA membrane showed a permeating behavior similar to that of M_0mM in this study, describable by the much-pronounced reduction in $N_2$ permeance than $CO_2$ permeance when dry feed was changed to wet feed. This could result mainly from defect blocking through the strong adsorption of water molecules. Accordingly, a molecular sieving effect in favor of $CO_2$ permeance was then realized in the presence of $H_2O$ vapor, which played a beneficial role in $CO_2$ perm-selectivity. In contrast, SSZ-13 and DDR membranes showed high $CO_2/N_2$ SFs under dry and wet conditions. Specifically, the $CO_2/N_2$ SFs under wet conditions were slightly higher than those under dry conditions, while the corresponding $CO_2$ permeance was considerably decreased (~2-3 times). Although a possibility due to the above-mentioned defect healing on the SSZ-13 and DDR membranes could not be excluded completely (Kosinov, N. et al., *J. Mater. Chem. A* 2014, 2, 13083-13092; Kim, E. et al., *J. Mater. Chem. A* 2017, 5, 11246-11254), the influence of the defects on the performance was not remarkable compared to M_0mM. The permeation behaviors of these two membranes were rather close to that of M_50mM, also supporting the less significant effect of the defects. For practical uses, securing a very high molar flux through the fabrication of a very thin SSZ-13 membrane (Agrawal, K. V. et al., *Adv. Mater.* 2015, 27, 3243-3249) on high flux supports (Shan, L. J. et al., *J. Membr. Sci.* 2011, 378, 319-329) is desirable as a follow-up task. Along with the $CO_2/N_2$ separation performance, the $CO_2/CH_4$ separation performances of M_0mM and M_50mM at 40-50° C. were compared with those of SAPO-34 (Li, S. G. et al., *Ind. Eng. Chem. Res.* 2005, 44, 3220-3228), DDR(Himeno, S. et al., *Ind. Eng. Chem. Res.* 2007, 46, 6989-6997), SSZ-13 (Kosinov, N. et al., *J. Mater. Chem. A* 2014, 2, 13083-13092; Wu, T. et al., *J. Membr. Sci.* 2015, 473, 201-209), DDR (Himeno, S. et al., *Ind. Eng. Chem. Res.* 2007, 46, 6989-6997), SSZ-13 (Kosinov, N. et al., *J. Mater. Chem. A* 2014, 2, 13083-13092; Wu, T. et al., *J. Membr. Sci.* 2015, 473, 201-209), and Si-CHA (Kida, K. et al., *J. Membr. Sci.* 2017, 522, 363-370) zeolite membranes (FIG. 9b). In particular, the $CO_2/CH_4$ separation performances were compared at 40-50° C., which are the representative temperatures of biogas streams (Favre, E. et al., *J. Membr. Sci.* 2009, 328, 11-14). Under dry conditions, M_50mM showed $CO_2/CH_4$ SF superior to that of the high-quality SSZ-13 membrane (Kosinov, N. et al., *J. Mater. Chem. A* 2014, 2, 13083-13092). Indeed, both 8 membered-ring CHA and DDR type zeolite membranes, which are highly expected to recognize the size difference between the $CO_2$ and $CH_4$ molecules, were desirable for performing the separation of $CO_2$ from the bulkier $CH_4$ than from the slightly smaller $N_2$. The $CO_2/CH_4$ separation performance of zeolite membranes has been primarily reported near room temperature. Despite the lab-scale test, investigation of the $CO_2/CH_4$ separation performance under more realistic conditions is required. In this aspect, the intact SSZ-13 membranes (i.e., M_0mM) showed very high separation performance especially under wet conditions at ~50° C., apparently due to the above-mentioned defect blocking by the physisorbed water molecules.

The comparison of the separation performances of M_0mM and M_50mM with membranes reported in other literature (FIG. 9) provided an insight into the effect of the defects on the final separation performance. First, M_50mM, which can be considered as a defect-free membrane, had excellent $CO_2$ perm-selectivities over both $N_2$ and $CH_4$ under dry conditions, but not under wet conditions. In contrast, M_0mM, albeit containing some degree of defects, showed separation performance superior to the defect-free membranes under wet conditions, owing to defect healing or blocking by the physisorbed water molecules.

INDUSTRIAL APPLICABILITY

The post-treatment method according to the present invention is a simple method which is performed under mild conditions (room temperature and normal pressure), unlike a conventional post-treatment method, and thus is a universal method that can be applied to different kinds of zeolite membranes. In addition, since the dye reagent used in the post-treatment method is cheaper and easier to obtain than the reagents used in other post-treatment methods, it is highly likely to be preferentially selected when introducing the post-treatment method.

The dye has a size larger than that of zeolite pores and smaller than that of defects, and thus can selectively penetrate only the defects, thereby blocking the defects. Moreover, the degree of blocking of the dye can be controlled by adjusting the concentration of the dye.

Further, the membrane post-treated according to the present invention can implement a high-performance membrane having a high separation factor, particularly under dry conditions.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A method of post-treating a zeolite membrane, comprising:
    healing selectively defects in the zeolite membrane by treating a defective zeolite membrane with a chemical material having a size larger than that of pores of the zeolite membrane and smaller than that of defects in the zeolite membrane,
    wherein the chemical material is a dye.

2. The method of post-treating a zeolite membrane of claim 1, wherein the dye is one or more selected from the group consisting of an anthraquinone dye, a triarylmethane dye, a xanthene dye, a cyanine dye, a phthalocyanine dye, a diarylmethane dye, an acridine dye, an azine dye, a thiazine dye, an oxazine dye, an azomethine dye, and an azo dye.

3. The method of post-treating a zeolite membrane of claim 2, wherein the xanthene dye is one or more selected from the group consisting of an eosin-based dye, a fluorescein-based dye, a rhodamine-based dye, a pyronine-based dye, a calcein-based dye, and a rosamine-based dye.

4. The method of post-treating a zeolite membrane of claim 1, wherein the dye is fluorescein sodium, Martius yellow, BBIH(2'-(4-Hydroxyphenyl)-5-(4-methyl-1-piperazinyl)-2,5'-bi(1H-benzimidazole) trihydrochloride), stilbene, DCM (4-(dicyanomethylene)-2-methyl-6-(4-dimethylaminostyryl)-4H-pyran) or oxazole yellow.

5. The method of post-treating a zeolite membrane of claim 3, wherein the fluorescein-based dye is a fluorescein sodium salt represented by Chemical Formula 1:

[Chemical Formula 1]

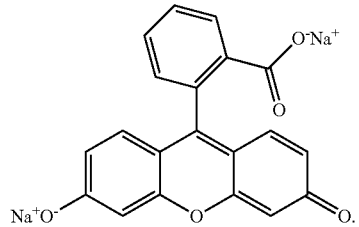

6. The method of post-treating a zeolite membrane of claim 1, wherein a size of the dye is 0.8-3 nm.

7. The method of post-treating a zeolite membrane of claim 1, which is performed under room temperature and normal pressure conditions.

8. A method of separating $CO_2$ from a mixture comprising the $CO_2$ and a molecule selected from the group consisting of $CH_4$, $N_2$, $O_2$, $C_2H_4$, $C_2H_6$, $C_3H_6$ and $C_3H_8$, comprising:
    contacting the zeolite membrane post-treated by the method of claim 1 with the mixture; and
    capturing the $CO_2$ from the mixture permeated through the zeolite membrane.

* * * * *